US010921032B2

(12) United States Patent
Goel

(10) Patent No.: US 10,921,032 B2
(45) Date of Patent: Feb. 16, 2021

(54) METHOD OF AND SYSTEM FOR REDUCING REFRIGERANT PRESSURE IN HVAC SYSTEMS

(71) Applicant: Lennox Industries Inc., Richardson, TX (US)

(72) Inventor: Rakesh Goel, Irving, TX (US)

(73) Assignee: Lennox Industries Inc., Richardson, TX (US)

( * ) Notice: Subject to any disclaimer, the term of this patent is extended or adjusted under 35 U.S.C. 154(b) by 77 days.

(21) Appl. No.: 16/421,611

(22) Filed: May 24, 2019

(65) Prior Publication Data

US 2019/0277546 A1 Sep. 12, 2019

Related U.S. Application Data

(60) Division of application No. 14/706,945, filed on May 7, 2015, now Pat. No. 10,330,358, which is a
(Continued)

(51) Int. Cl.
*F25B 41/00* (2006.01)
*F16L 55/02* (2006.01)
(Continued)

(52) U.S. Cl.
CPC ............ *F25B 41/003* (2013.01); *F16L 55/02* (2013.01); *F25B 41/04* (2013.01); *F25B 45/00* (2013.01);
(Continued)

(58) Field of Classification Search
CPC ........ F25B 41/003; F25B 41/04; F25B 45/00; F25B 49/005; F25B 2341/0662;
(Continued)

(56) References Cited

U.S. PATENT DOCUMENTS 1,944,899 A * 1/1934 Miller .................. F25B 49/005
 62/231
3,563,304 A 2/1971 McGrath
(Continued)

FOREIGN PATENT DOCUMENTS

DE 10317551 B3 4/2004
EP 1821048 A2 8/2007
(Continued)

OTHER PUBLICATIONS

Ito et al., Air Conditioner, Aug. 10, 1993, JPH05203275A Whole Document (Year: 1993).
(Continued)

*Primary Examiner* — Ljiljana V. Ciric
(74) *Attorney, Agent, or Firm* — Shackelford, Bowen, McKinley & Norton, LLP

(57) ABSTRACT

A method that determines whether at least one condition indicating a likelihood of one or more high refrigerant pressures within a heating, ventilation, and air-conditioning (HVAC) system is present. The method includes generating a first control signal configured to switch a first valve from an open to a closed position in response to determining that at least one condition indicating a likelihood of one or more high refrigerant pressures within the HVAC system is present and upon expiration of a defined first period of time. The method further includes generating a second control signal configured to switch the first valve from a closed to an open position following generation of the first control signal and upon expiration of a defined second period of time.

20 Claims, 9 Drawing Sheets

Related U.S. Application Data continuation-in-part of application No. 14/279,043, filed on May 15, 2014, now Pat. No. 9,976,785.

(51) Int. Cl.
   *G05D 16/20* (2006.01)
   *F25B 41/04* (2006.01)
   *F25B 45/00* (2006.01)
   *F25B 49/00* (2006.01)

(52) U.S. Cl.
   CPC ....... *F25B 49/005* (2013.01); *G05D 16/2006* (2013.01); *F25B 2341/065* (2013.01); *F25B 2341/0662* (2013.01); *F25B 2400/16* (2013.01); *F25B 2500/07* (2013.01); *F25B 2500/26* (2013.01); *Y10T 137/0396* (2015.04); *Y10T 137/86381* (2015.04)

(58) Field of Classification Search
   CPC .............. F25B 2400/16; F25B 2500/07; F25B 2500/26; F25B 2341/065; F16L 55/02; G05D 16/2006; Y10T 137/0396; Y10T 137/86381
   See application file for complete search history.

(56) References Cited

U.S. PATENT DOCUMENTS

| | | | |
|---|---|---|---|
| 3,643,462 A * | 2/1972 | Eberhart | F25B 49/027 62/196.4 |
| 3,777,508 A | 12/1973 | Imabayashi et al. | |
| 4,030,315 A | 6/1977 | Harnish | |
| 4,110,998 A * | 9/1978 | Owen | F25B 43/00 62/125 |
| 4,215,555 A | 8/1980 | Cann et al. | |
| 4,242,873 A | 1/1981 | Hino | |
| 4,383,419 A * | 5/1983 | Bottum | F25B 30/06 62/119 |
| 4,437,317 A | 3/1984 | Ibrahim | |
| 4,480,446 A * | 11/1984 | Margulefsky | F25B 45/00 62/292 |
| 4,522,037 A * | 6/1985 | Ares | F25B 5/02 62/196.4 |
| 4,551,983 A | 11/1985 | Atsumi et al. | |
| 4,554,792 A * | 11/1985 | Margulefsky | F25B 45/00 62/149 |
| 4,655,051 A | 4/1987 | Jones | |
| 4,766,734 A | 8/1988 | Dudley | |
| 4,771,610 A | 9/1988 | Nakashima et al. | |
| 4,861,561 A * | 8/1989 | Pritchard | B01D 11/0207 422/116 |
| RE33,212 E * | 5/1990 | Lower | B60H 1/00585 62/126 |
| 4,942,743 A | 7/1990 | Gregory | |
| 5,042,271 A * | 8/1991 | Manz | F25B 43/02 62/473 |
| 5,117,645 A | 6/1992 | Bryant | |
| 5,136,855 A | 8/1992 | Lenarduzzi | |
| 5,159,817 A | 11/1992 | Hojo et al. | |
| 5,548,971 A | 8/1996 | Rockenfeller et al. | |
| 5,628,200 A | 5/1997 | Pendergrass | |
| 5,651,263 A | 7/1997 | Nonaka et al. | |
| 5,651,265 A | 7/1997 | Grenier | |
| 5,653,120 A | 8/1997 | Meyer | |
| 5,758,514 A * | 6/1998 | Genung | F25B 41/06 62/471 |
| 5,802,859 A * | 9/1998 | Zugibe | F25B 45/00 62/125 |
| 5,848,537 A | 12/1998 | Biancardi et al. | |
| 5,896,754 A * | 4/1999 | Balthazard | B60H 1/3229 62/507 |
| 5,937,665 A | 8/1999 | Kiessel et al. | |
| 6,055,818 A | 5/2000 | Valle et al. | |
| 6,470,704 B2 * | 10/2002 | Shibata | F25B 39/04 165/173 |
| 6,904,963 B2 * | 6/2005 | Hu | F28D 1/0443 165/140 |
| 8,051,675 B1 * | 11/2011 | Carlson | F25B 43/00 62/512 |
| 8,602,093 B2 * | 12/2013 | Iwasaki | F28D 1/0435 165/287 |
| 9,499,026 B2 | 11/2016 | Brodie et al. | |
| 9,599,380 B2 * | 3/2017 | Yamashita | F25B 45/00 |
| 9,618,237 B2 * | 4/2017 | Kim | F25B 43/006 |
| 9,644,906 B2 * | 5/2017 | Shimamoto | F24F 11/30 |
| 9,651,287 B2 * | 5/2017 | Morimoto | F25B 13/00 |
| 9,664,191 B2 | 5/2017 | Tanaka | |
| 9,732,992 B2 * | 8/2017 | Yamashita | F25B 49/02 |
| 9,777,950 B2 | 10/2017 | Uselton | |
| 9,823,000 B2 * | 11/2017 | Wang | F25B 41/003 |
| 9,834,063 B2 * | 12/2017 | Kang | F25B 41/04 |
| 9,855,821 B2 * | 1/2018 | Kang | F25B 6/04 |
| 9,862,251 B2 | 1/2018 | Brodie et al. | |
| 10,330,358 B2 | 6/2019 | Goel | |
| 2001/0029747 A1 * | 10/2001 | Gaul | F04B 41/06 62/498 |
| 2002/0003037 A1 * | 1/2002 | Cousineau | F25B 41/04 165/278 |
| 2004/0000153 A1 * | 1/2004 | Bagley | F25B 41/04 62/140 |
| 2004/0025526 A1 | 2/2004 | Aflekt et al. | |
| 2004/0148956 A1 * | 8/2004 | Arshansky | F25B 9/008 62/335 |
| 2005/0066678 A1 | 3/2005 | Kamimura | |
| 2005/0120733 A1 | 6/2005 | Healy et al. | |
| 2005/0132728 A1 | 6/2005 | Lifson et al. | |
| 2005/0247070 A1 * | 11/2005 | Arshansky | F25B 45/00 62/77 |
| 2006/0010899 A1 | 1/2006 | Lifson et al. | |
| 2006/0123834 A1 | 6/2006 | Hwang et al. | |
| 2007/0193285 A1 * | 8/2007 | Knight | G01M 3/228 62/126 |
| 2008/0034777 A1 | 2/2008 | Copeland et al. | |
| 2008/0104975 A1 * | 5/2008 | Gorbounov | F25B 43/006 62/117 |
| 2008/0296005 A1 * | 12/2008 | Taras | F28D 1/05375 165/173 |
| 2008/0314064 A1 | 12/2008 | Al-Eidan | |
| 2009/0211283 A1 | 8/2009 | Koh et al. | |
| 2009/0229285 A1 | 9/2009 | Sato et al. | |
| 2009/0229300 A1 | 9/2009 | Fujimoto et al. | |
| 2009/0241569 A1 | 10/2009 | Okada et al. | |
| 2009/0241573 A1 * | 10/2009 | Ikegami | B60H 1/00342 62/238.7 |
| 2010/0064710 A1 | 3/2010 | Slaughter | |
| 2010/0218513 A1 | 9/2010 | Vaisman et al. | |
| 2010/0326075 A1 | 12/2010 | Fong et al. | |
| 2011/0041523 A1 | 2/2011 | Taras et al. | |
| 2011/0146321 A1 | 6/2011 | Jin | |
| 2011/0154848 A1 | 6/2011 | Jin | |
| 2011/0192176 A1 | 8/2011 | Kim et al. | |
| 2011/0197600 A1 | 8/2011 | Hamada et al. | |
| 2012/0111042 A1 | 5/2012 | Hamada et al. | |
| 2012/0227426 A1 | 9/2012 | Deaconu | |
| 2012/0227429 A1 | 9/2012 | Louvar et al. | |
| 2012/0324911 A1 * | 12/2012 | Shedd | H01L 23/427 62/62 |
| 2013/0098088 A1 | 4/2013 | Lin et al. | |
| 2013/0174595 A1 | 7/2013 | Okuda et al. | |
| 2013/0340451 A1 | 12/2013 | Sapp et al. | |
| 2014/0311172 A1 | 10/2014 | Iwasaki | |
| 2014/0326018 A1 | 11/2014 | Ignatiev | |
| 2014/0345310 A1 | 11/2014 | Tamaki et al. | |
| 2015/0020536 A1 | 1/2015 | Lee et al. | |
| 2015/0040594 A1 | 2/2015 | Suzuki et al. | |
| 2015/0075204 A1 * | 3/2015 | Brodie | B60H 1/00914 62/324.6 |
| 2015/0089967 A1 | 4/2015 | Kim et al. | |
| 2015/0267925 A1 | 9/2015 | Inada et al. | |
| 2015/0267946 A1 | 9/2015 | Lowstuter, Jr. et al. | |
| 2015/0276271 A1 | 10/2015 | Uselton | |

(56) References Cited

U.S. PATENT DOCUMENTS

| | | |
|---|---|---|
| 2015/0276290 A1 | 10/2015 | Aoyama |
| 2016/0178222 A1 | 6/2016 | Bush et al. |
| 2016/0195311 A1 | 7/2016 | Li et al. |
| 2016/0273795 A1 | 9/2016 | Takenaka et al. |
| 2016/0298893 A1* | 10/2016 | Knatt .................. F25B 49/02 |
| 2017/0016659 A1 | 1/2017 | Chen et al. |
| 2017/0059219 A1 | 3/2017 | Goel |
| 2018/0094841 A1* | 4/2018 | Kester .................. F25B 41/062 |
| 2019/0323747 A1* | 10/2019 | Giles .................... F25B 6/04 |
| 2020/0124313 A1* | 4/2020 | Todoroki .............. H05K 7/20 |
| 2020/0240684 A1* | 7/2020 | Reardon ................ F24F 11/74 |

FOREIGN PATENT DOCUMENTS

| | | |
|---|---|---|
| JP | H05203275 A | 8/1993 |
| JP | 11248266 | 9/1999 |
| JP | 2002195705 A | 7/2002 |
| WO | WO-94/14016 A1 | 6/1994 |

OTHER PUBLICATIONS

U.S. Appl. No. 16/014,436, Bachellor.

Lattanzi, Matt and Priestley, Doug, Micro-Channel Evaporator-Coil Technology, RSES Journal [online], Oct. 2012, pp. 14-18, [retrieved on Sep. 30, 2017]. Retrieved from the internett <URL: https://www.rses.org/assets/rses_journal/1012_Evaporators.pdf>.

"Microchannel Coil Servicing Guidelines: Trane Unitary Light and Commercial Units", Trane [online], May 5, 2011, pp. 1-16, [retrieved on Sep. 30, 2017]. Retrieved from the internet <https://www.trane.com/content/dam/Trane/Commercial/lar/es/product-systems/comercial/Rooftops/Accesorios-Rooftops;/IOM/Microchannel%20IOM%20(Ingl%C3%A9s).pdf>.

* cited by examiner

METHOD OF AND SYSTEM FOR REDUCING REFRIGERANT PRESSURE IN HVAC SYSTEMS

CROSS-REFERENCE TO RELATED APPLICATIONS

This Application is a divisional of U.S. patent application Ser. No. 14/706,945, filed on May 7, 2015. U.S. patent application Ser. No. 14/706,945 is a continuation in part of U.S. patent application Ser. No. 14/279,043, filed on May 15, 2014 which is now U.S. Pat. No. 9,976,785. U.S. patent application Ser. No. 14/706,945 and U.S. Pat. No. 9,976,785 are incorporated herein by reference.

FIELD OF THE INVENTION

The present invention relates to Heating, Ventilating, and Air Conditioning (HVAC) systems and, more particularly, to providing refrigerant pressure relief to HVAC systems.

DESCRIPTION OF THE RELATED ART

One problem in Heating, Ventilation, and Air Conditioning (HVAC) systems is the occurrence of over-pressurization of refrigerant within the HVAC system. Operation while a refrigerant over-pressurization condition exists may be harmful to HVAC system components, such as the compressors, for example. To prevent operation during refrigerant over-pressurization, pressure switches may be provided and may de-energize the compressors for a period of time in response to detection of refrigerant over-pressurization. The de-energizing of a compressor in response to refrigerant over-pressurization may be called a "high pressure trip." During HVAC system operation, including at startup, the compressors may be energized and de-energized several times in response to recurring refrigerant over-pressurization. Operation of the compressors in this manner, rapidly alternating the compressors between energized and de-energized states in response to refrigerant pressure conditions, may also be harmful to the compressors.

SUMMARY

Systems and methods for reducing refrigerant pressures within an HVAC system are provided, herein. An apparatus for reducing refrigerant pressure within an HVAC system may comprise a receptacle which may couple to a first tube at a second end of the first tube. The first tube may couple to a manifold at a first end of the first tube. The manifold may couple to a condenser and may receive refrigerant from at least one outlet of a first pass of tubing through the condenser. The receptacle may be in fluid communication with the at least one outlet of the first pass of tubing through the condenser, whereby refrigerant exiting the first pass of tubing of the condenser may migrate into, or drain from, the receptacle in response to, at least, one or more refrigerant pressures within the HVAC system.

An HVAC system may comprise a receptacle and a first tube. The first tube may couple to a manifold at a first end of the first tube and may couple to the receptacle at a second end of the first tube. The manifold may couple to a condenser and may receive refrigerant from at least one outlet of a first pass of tubing through the condenser. The receptacle may be in fluid communication with the at least one outlet of the first pass of tubing through the condenser via the first tube. The first tube may form a conduit for refrigerant migration into the receptacle in response to, at least, one or more high refrigerant pressures within the HVAC system. The first tube may form a conduit for refrigerant draining from the receptacle in response to, at least, one or more low refrigerant pressures within the HVAC system. A first valve may couple to the first tube. The first valve may permit refrigerant to migrate into or drain from the receptacle when open. The first valve may prevent refrigerant from migrating into or draining from the receptacle when closed. A controller may be operable to determine whether at least one condition indicating a likelihood of one or more high refrigerant pressures within the HVAC system is present. The controller may generate a first control signal to close the first valve in response to at least one condition indicating a likelihood of one or more high refrigerant pressures being present within the HVAC system upon expiration of a defined first period of time. The controller may generate a second control signal to open the first valve following generation of the first control signal and upon expiration of a defined second period of time.

A method for reducing refrigerant pressure within an HVAC system may comprise a controller which may determine whether at least one condition indicating a likelihood of one or more high refrigerant pressures within the HVAC system is present. The controller may generate a first control signal to close a first valve if at least one condition indicating a likelihood of one or more high refrigerant pressures within the HVAC system is determined to be present and upon expiration of a defined first period of time. The first valve may couple to a first tube and may permit refrigerant to flow through the first tube when open. The first valve may prevent refrigerant to flow through the first tube when closed. The first tube may couple to a manifold of a condenser. The manifold may receive refrigerant from at least one outlet of a first pass of tubing through the condenser. The first tube may couple to a first receptacle which may be in fluid communication with the first pass of tubing through a condenser via the first tube and the manifold. The receptacle may receive refrigerant exiting the first pass of the condenser at times when one or more high refrigerant pressures are present within the HVAC system. The controller may generate a second control signal which may close the first valve following the expiration of a defined second period of time after generation of the first control signal.

Advantageously, the systems and methods provided, herein, may reduce refrigerant pressures within an HVAC system in response to conditions that may, otherwise, cause high discharge pressure trips within the HVAC system. A portion of the HVAC system refrigerant may be allowed to migrate into the reservoir of the pressure relief apparatus, removing refrigerant from the vapor compression cycle components. The removal of refrigerant may reduce the refrigerant pressures within the HVAC system. The location of the pressure relief apparatus within the HVAC system, as described herein, may ensure that liquid phase refrigerant migrates into the relief reservoir. The pressure relief apparatus may have greater pressure reducing effect on the HVAC system when liquid refrigerant, rather than gaseous refrigerant, is removed from the vapor compression cycle components. Additionally, the pressure relief apparatus may provide for reintroduction of the removed refrigerant upon a sufficient reduction of refrigerant pressures within the vapor compression cycle components of the HVAC system. Reintroduction of the removed refrigerant may restore the HVAC system its maximum heating or cooling capacity.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

The Liquid Line Charge Compensator Apparatus 101

Figure 1A:
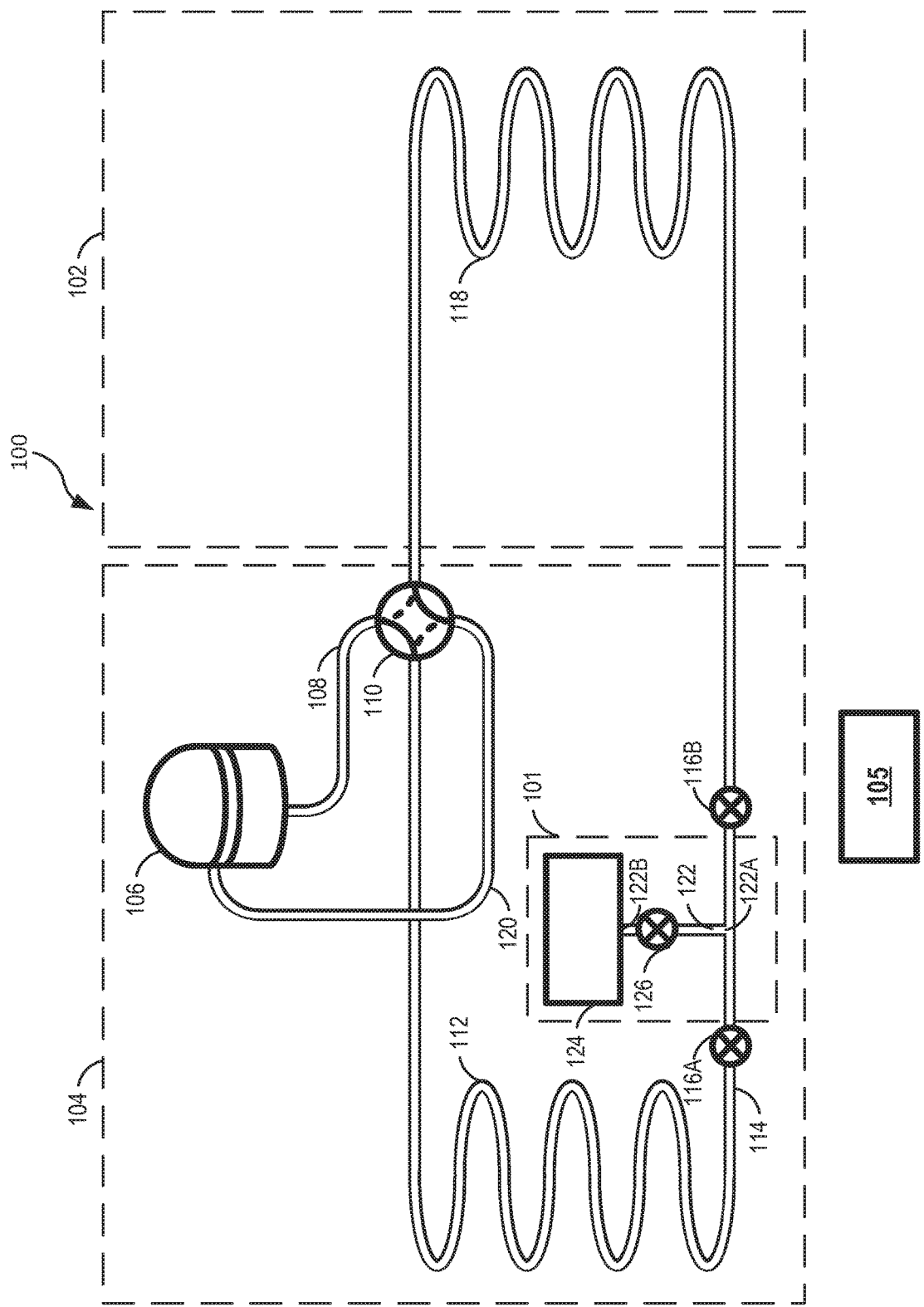
FIG. 1A depicts a first HVAC system with a first charge compensator apparatus located in the ambient environment of the outdoor heat exchanger.

FIG. 1A depicts an HVAC system 100 with a liquid line charge compensator apparatus 101. The HVAC system 100 may comprise an indoor unit 102, an outdoor unit 104, and a controller 105. The indoor unit 102 may reside inside a structure to be heated or cooled, such as a building or refrigerator. Similarly, the outdoor unit 104 may reside outside the structure. Generally, residential HVAC systems may operate with this particular combination of an indoor unit and an outdoor unit. Besides residential HVAC systems, the combination may be used in other applications such as commercial rooftop package units and refrigeration.

In the absence of high discharge pressure, the HVAC system 100 may operate conventionally. A continuous flow of refrigerant charge may travel in a loop, called a vapor compression cycle, through the HVAC system 100. A compressor 106 may compress the HVAC system 100 refrigerant in gas vapor form and may discharge the refrigerant vapor through a discharge line 108. The compressed refrigerant gas vapor may enter a reversing valve 110. The reversing valve 110 may change between a cooling configuration, shown by solid lines, and a heating configuration, shown by dashed lines.

In the cooling configuration, the refrigerant may flow from the reversing valve 110 to an outdoor heat exchanger 112. The refrigerant may flow through the outdoor heat exchanger 112, releasing heat into the outdoor air. The refrigerant may condense into a liquid as it flows through the outdoor heat exchanger 112. From the outdoor heat exchanger 112, the liquid refrigerant may flow through a liquid line 114.

The liquid line 114 may have an expansion device 116A and an expansion device 116B. Either the expansion device 116A or the expansion device 116B may reduce the pressure of the refrigerant by expanding the liquid refrigerant flowing through the liquid line 114. Due to check valves or the like, the expansion device 116A may only act on refrigerant flowing toward the outdoor heat exchanger 112, and the expansion device 116B may only act on refrigerant flowing toward an indoor heat exchanger 118.

When the HVAC system 100 is in the cooling configuration, liquid refrigerant may bypass the expansion device 116A and may continue toward the expansion device 116B. The expansion device 116B may reduce the pressure of the liquid refrigerant flowing through it. The liquid refrigerant may flow through the indoor heat exchanger 118, absorbing heat from the structure and evaporating into a gas vapor. The refrigerant may flow to the reversing valve 110, where it may be directed through a suction line 120 and back into the compressor 106 to be compressed again.

In the heating configuration, the refrigerant may flow from the reversing valve 110 to the indoor heat exchanger 118. The refrigerant may flow through the indoor heat exchanger 118, releasing heat into a structure. The refrigerant may condense into a liquid as it flows through the indoor heat exchanger 118. From the indoor heat exchanger 118, the liquid refrigerant may flow through the liquid line 114. The liquid refrigerant may bypass the expansion device 116B and may flow to the expansion device 116A. The expansion device 116A may reduce the pressure of the liquid refrigerant flowing through it. The refrigerant may flow through the outdoor heat exchanger 112, absorbing heat from the outdoor air and evaporating into a gas vapor. The refrigerant may flow to the reversing valve 110, where it may be directed through the suction line 120 and back into the compressor 106 to be compressed again.

The outdoor heat exchanger 112 may be called an outdoor coil. The indoor heat exchanger 118 may be called an indoor coil. During cooling, the outdoor heat exchanger 112 may be called a condenser and the indoor heat exchanger 118 may be called an evaporator. During heating, the outdoor heat exchanger 112 may be called the evaporator and the indoor heat exchanger 118 may be called the condenser. The expansion devices 116A and 116B may be expansion valves.

According to the embodiment shown, the HVAC system 100 may be capable of both heating and cooling operation. An HVAC system that can perform both may be called a heat pump. An air conditioner or heater may be substituted for the HVAC system 100. An air conditioner may be an HVAC system which is capable of only cooling. A heater may be an HVAC system which is capable of only heating.

In an HVAC system that is capable of either heating or cooling, but not both, the reversing valve 110 may be unnecessary since the direction of refrigerant flow does not reverse. The expansion device 116A may also be unnecessary in an air conditioner because refrigerant does not flow through the liquid line 114 toward the outdoor heat exchanger 112. Likewise, the expansion device 116B may be unnecessary in a heater because refrigerant does not flow through the liquid line 114 toward indoor heat exchanger 118.

The charge compensator apparatus 101 may comprise a compensator line 122, a charge compensator reservoir 124, and a compensator valve 126. The charge compensator apparatus 101 may be located between the expansion device 116A and the expansion device 116B. The compensator line 122 may connect the liquid line 114 to the charge compensator reservoir 124. The connection 122A may be the connection between the compensator line 122 and the liquid line 114. The connection 122B may be the connection between the compensator line 122 and the charge compensator reservoir 124. The charge compensator reservoir 124 may be a tank which holds excess refrigerant. The charge compensator reservoir 124 may be made of steel. The connection 122B may be vertically higher than the connection 122A, so that gravity may drain refrigerant from the charge compensator reservoir 124 into the liquid line 114.

The compensator valve 126 may be positioned on the compensator line 122. The compensator valve 126 may be opened, to permit the flow of refrigerant through the compensator line 122, or closed, to block the flow of refrigerant through the compensator line 122. The compensator valve 126 may be a solenoid valve.

When the compensator valve 126 is open, relatively high pressure in the liquid line 114 may cause refrigerant to migrate into the charge compensator reservoir 124. Lower pressure in the liquid line 114 may cause refrigerant to drain from the charge compensator reservoir 124 into the liquid line 114. The compensator valve 126 may be closed to keep the refrigerant from draining.

The controller 105 may operate the compensator valve 126. Where the compensator valve 126 is a solenoid valve, the controller 105 may send current through the compensator valve 126 directly or send a signal that causes current to be sent through the compensator valve 126. The controller 105 may be a unit controller that controls the overall operation of the indoor unit 102 and the outdoor unit 104, or may be a separate controller that only controls when the compensator valve 126 opens and closes.

Figure 1B:
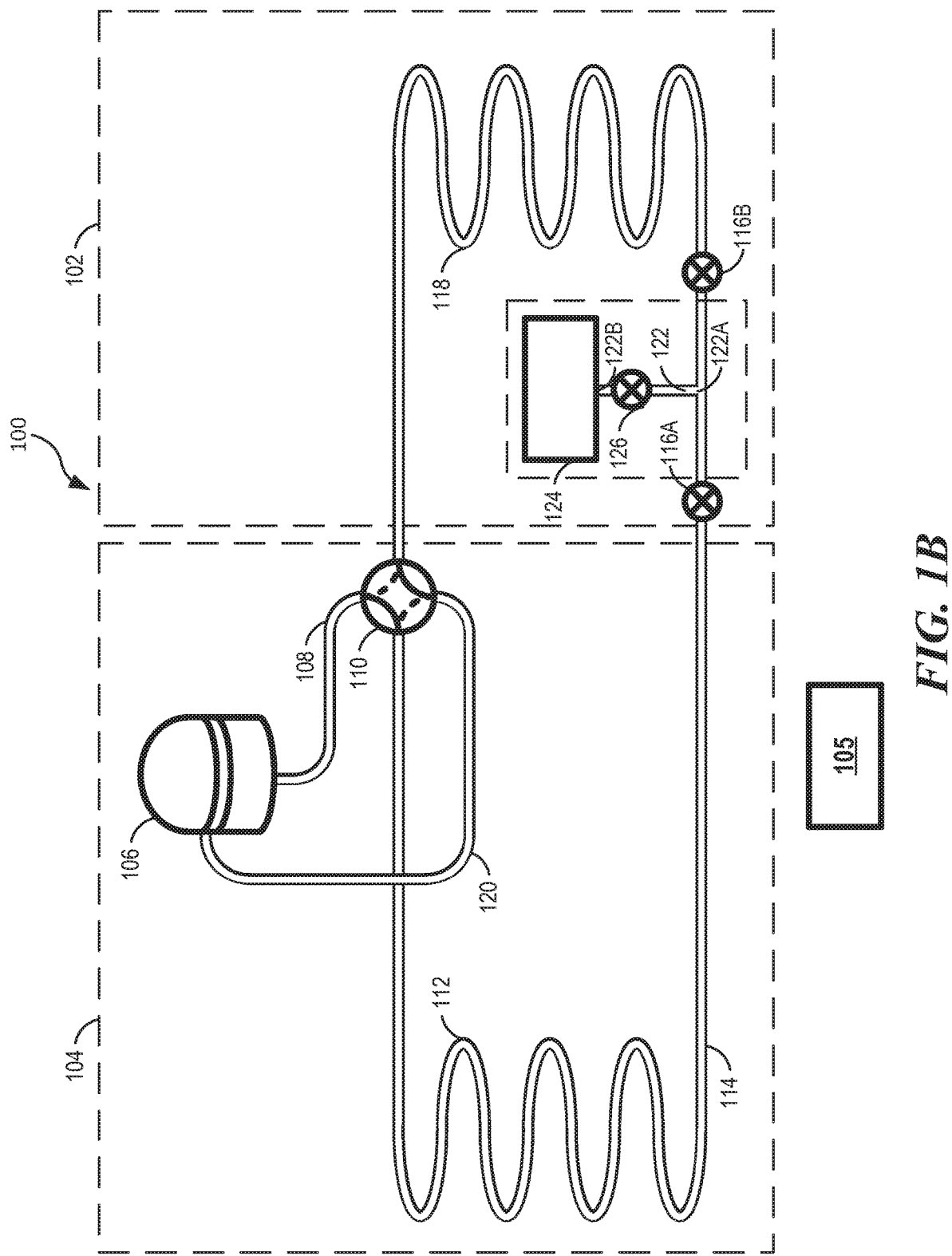
FIG. 1B depicts the first HVAC system with the first charge compensator apparatus located in the ambient environment of the indoor heat exchanger.

In the embodiment of FIG. 1A, the charge compensator apparatus 101 is shown inside the outdoor unit 104. More generally. FIG. 1A shows the charge compensator reservoir 124 in the ambient environment of the outdoor heat exchanger 112. As shown in the embodiment of FIG. 1B, the charge compensator reservoir 124 may additionally, or alternatively, be located inside the indoor unit 102. More generally, FIG. 1B shows the charge compensator reservoir 124 in the ambient environment of the indoor heat exchanger 118.

During cooling, the charge compensator reservoir 124 in FIG. 1A may be in the ambient environment of the condenser. During heating, the charge compensator reservoir 124 in FIG. 1A may be in the ambient environment of the evaporator. During cooling, the charge compensator reservoir 124 in FIG. 1B may be in the ambient environment of the evaporator. During heating, the charge compensator reservoir 124 in FIG. 1B may be in the ambient environment of the condenser.

The location of the charge compensator reservoir 124 in FIG. 1A may be upstream or downstream of the outdoor heat exchanger 112. The location of the charge compensator reservoir 124 in FIG. 1B may be upstream or downstream of the indoor heat exchanger 118. The charge compensator reservoir 124 is "upstream" of a heat exchanger when air flows past the charge compensator reservoir 124 before flowing past the heat exchanger. The charge compensator reservoir 124 is "downstream" of a heat exchanger when air flows past the charge compensator reservoir 124 after flowing past the heat exchanger.

The location of the charge compensator reservoir 124 may affect the temperature of the charge compensator reservoir. When the charge compensator reservoir 124 is hotter, more pressure may be needed in the liquid line 114 to fill the charge compensator reservoir 124, but less pressure may be needed in the liquid line 114 to drain the charge compensator reservoir 124. The ambient environment of the condenser is generally hotter than the ambient environment of the evaporator. Air flowing past the condenser may be additionally heated, while air flowing past the evaporator may be additionally cooled. Generally speaking, the possible locations of the charge compensator reservoir 124 may be, in order from hottest to coldest, (1) in the ambient environment of the condenser, downstream of the condenser. (2) in the ambient environment of the condenser, upstream of the condenser, (3) in the ambient environment of the evaporator, upstream of the evaporator, and (4) in the ambient environment of the evaporator, downstream of the evaporator.

The desired location of the charge compensator apparatus 101 may be application dependent. The desired location of the charge compensator reservoir 124 may depend on pressure conditions in the liquid line 114 or be based on a need of a particular HVAC system to have a certain fill or drain rate. The desired location of the charge compensator reservoir 124 may be where the pressure in the charge compensator reservoir 124 would be the most consistent. The ambient temperature of the environment surrounding the charge compensator reservoir 124 may affect consistent state pressure.

Regardless of where the charge compensator reservoir 124 is located, the rest of the charge compensator apparatus 101 may be in the same location. The charge compensator apparatus 101 may be located between the expansion device 116A and the expansion device 116B, and the charge compensator apparatus 101 may be on the liquid line 114.

Figure 2A:
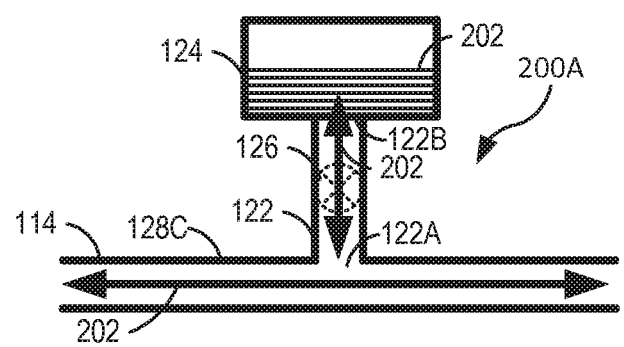
FIG. 2A depicts the first charge compensator apparatus configured to fill or drain a charge compensator reservoir.

Referring to FIG. 2A, the configuration 200A may be a configuration of the charge compensator apparatus 101 allowing for filling or draining of the charge compensator reservoir 124. In the configuration 200A, the compensator valve 126 may be open, as shown by the dotted lines. With the compensator valve 126 open, the refrigerant 202 in the liquid line 114 may enter or leave the charge compensator reservoir 124, depending on the pressure in the liquid line 114. High pressure in the liquid line 114 may cause the refrigerant 202 in the liquid line 114 to migrate into the charge compensator reservoir 124. The refrigerant 202 entering the charge compensator reservoir 124 may cause a reduction of the pressure in the vapor compression cycle and may prevent a high discharge pressure trip.

When the pressure in the liquid line 114 decreases sufficiently, the liquid refrigerant 202 within the charge compensator reservoir 124 may gradually flow back down the compensator line 122 due to gravity, past the compensator valve 126, and back into the liquid line 114. Because the configuration 200A depends on gravity, the connection 122B should be placed vertically higher than the connection 122A, so that gravity may drain refrigerant from the charge compensator reservoir 124 into the liquid line 114. In FIG. 2A, the liquid refrigerant 202 may flow through the liquid line 114 from left to right during cooling and from right to left during heating.

Figure 2B:
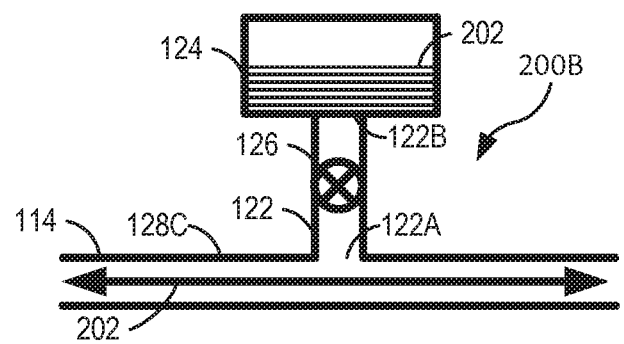
FIG. 2B depicts the first charge compensator apparatus configured to hold refrigerant in a charge compensator reservoir.

Referring to FIG. 2B, the configuration 200B may be a configuration of the charge compensator apparatus 101 which may hold the refrigerant 202 within the charge compensator reservoir 124. In the configuration 200B, the compensator valve 126 may be closed. The refrigerant 202 in the charge compensator reservoir 124 may be kept in the charge compensator reservoir 124 by the closed compensator valve 126.

In an embodiment, the compressor 106 may be configured for tandem operation as part of a tandem compressor group. A tandem compressor group may comprise two or more compressors. In tandem compressor operation, all of the tandem compressors may run simultaneously, a portion of the tandem compressors may operate, or only one tandem compressor may operate at a time. When a tandem compressor group operates using less than all of the tandem compressors, the tandem compressor group may be operating at part load. When a tandem compressor group operates using all of the tandem compressors, the tandem compressor group may be operating at full load. Full load is generally a response to high outdoor ambient conditions, such as a 95° F. outdoor ambient temperature, for example. When a tandem compressor starts all the compressors simultaneously, a higher amount of compression is created in a shorter amount of time compared to using only one compressor or the starting of a variable speed compressor at lower speed.

An HVAC system comprising a tandem compressor group often also comprises a microchannel condenser because together they deliver a high Integrated Energy Efficiency Ratio (IEER). Part load efficiency is important because the tandem compressor group is typically operated in part load unless there are high ambient conditions. In such an HVAC system, the outdoor heat exchanger 112 and/or the indoor heat exchanger 118 may be microchannel heat exchangers. During air conditioning, the outdoor heat exchanger 112 may be a microchannel condenser and the indoor heat exchanger 118 may be a microchannel evaporator. During heating, the indoor heat exchanger 118 may be a microchannel condenser and the outdoor heat exchanger 112 may be a microchannel evaporator.

When in part load conditions, an HVAC system implemented with a tandem compressor group may be optimized when there is additional refrigerant charge, typically one to two pounds, over the optimum refrigerant charge for full load conditions. When an HVAC system is optimized for part load conditions but operating in full load conditions, the additional refrigerant charge in the HVAC system may cause a spike in discharge pressure. The spike in discharge pressure may lead to a high discharge pressure trip. High discharge pressure trips can also occur at part load conditions.

Figure 3:
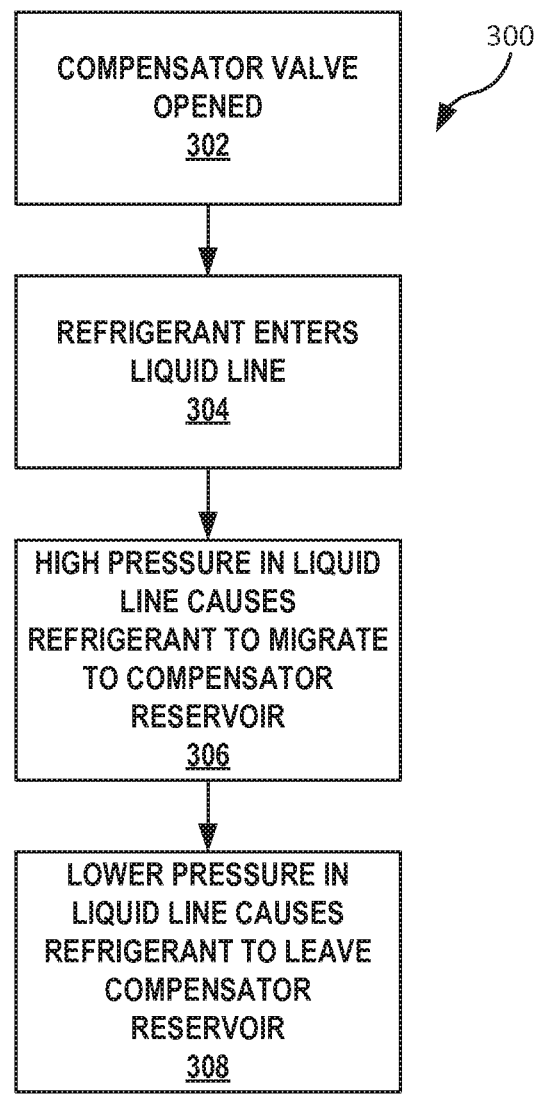
FIG. 3 depicts a first method for reducing refrigerant pressure in an HVAC system.

FIG. 3 depicts a method 300 for reducing discharge pressure in an HVAC system at startup of one or more system compressors. In an embodiment, the method 300 may be performed by the HVAC system 100 implemented with the charge compensator apparatus 101, as described above. Alternatively, the method 300 may be performed by the HVAC system 100 implemented with an alternative embodiment of the charge compensator apparatus 101 than described above, in which the compensator valve 126 is not provided.

At step 302, the compensator valve 126 may be opened. The charge compensator apparatus 101 may be in the configuration 200A. Alternately, the compensator valve 126 may be absent, as it is not used in the method 300. At step 304, liquid refrigerant may enter the liquid line 114 as part of vapor compression cycle operation. At step 306, the liquid refrigerant may enter the charge compensator reservoir 124 due to high pressure in the liquid line 114. At step 308, the liquid refrigerant may leave the charge compensator reservoir 124 due to gravity when the pressure in the liquid line 114 decreases.

Figure 4:
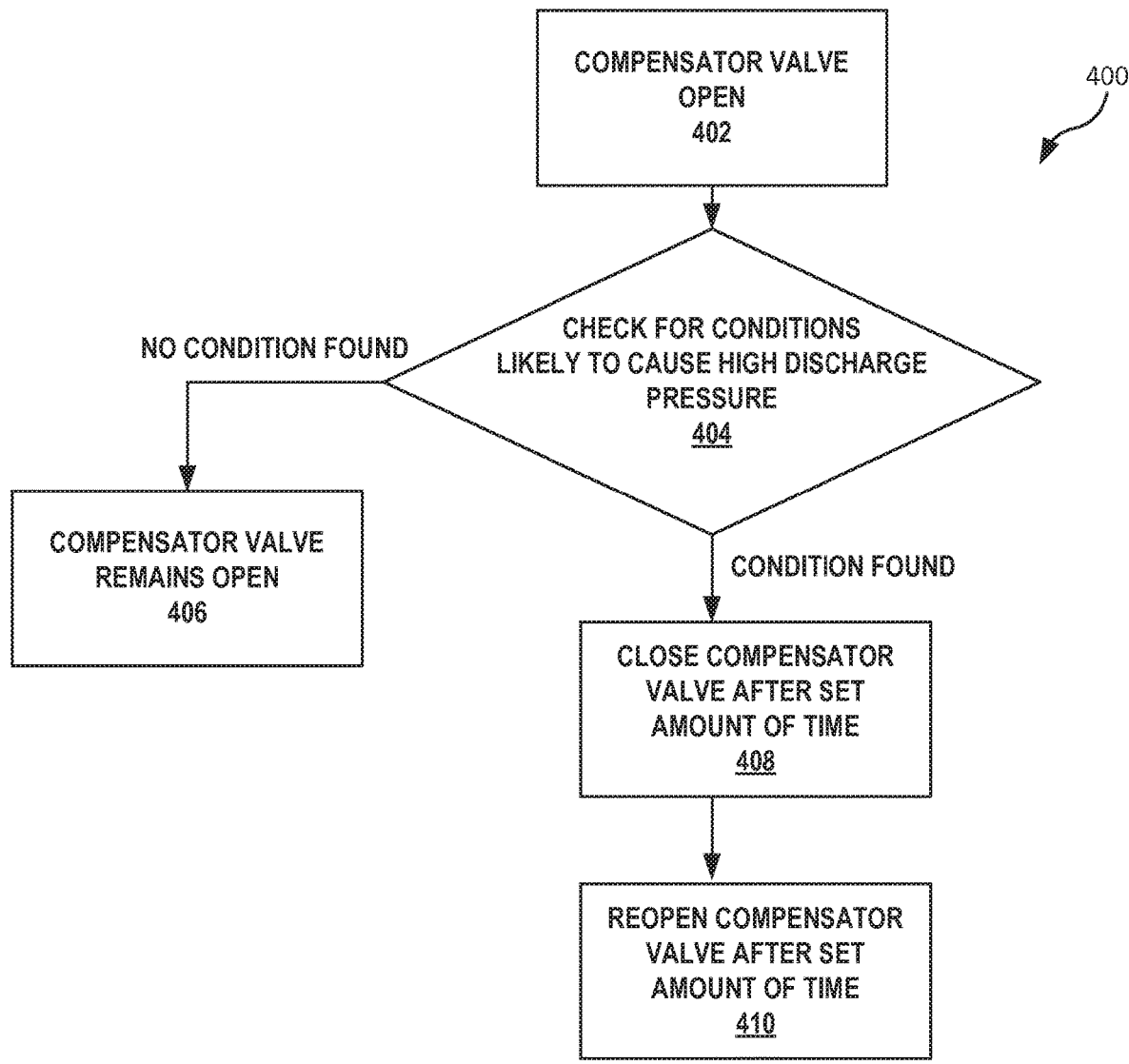
FIG. 4 depicts a second method for reducing refrigerant pressure in an HVAC system.

Referring to FIG. 4, a method 400 for reducing refrigerant pressure within an HVAC system is shown. In an embodiment, the method 400 may be performed by the HVAC system 100 implemented with the charge compensator apparatus 101, as described above. The controller 105 may perform the method 400. According to the method 400, refrigerant may be removed from vapor compression cycle operation and may be stored in the charge compensator reservoir 124. The method 400 may be performed when HVAC system 100 is started, and may also be performed periodically or continuously when the HVAC system 100 is operating.

At step 402, the compensator valve 402 may be open. The charge compensator apparatus 101 may be in the configuration 200A. Liquid refrigerant may enter the charge compensator reservoir 124 due to high pressure in the liquid line 114. At step 404, the controller 105 may check for a condition indicating a likelihood of high discharge pressure.

Many possible conditions may be checked for at step 404. One condition may be outdoor ambient temperature being within a certain temperature range, such as between 105° F. and 125° F. Another condition may be a tandem compressor changing from part load operation to full load operation. Another condition may be the HVAC system 100 being started after being off for more than a threshold amount of time, such as five minutes. Another condition may be the HVAC system 100 being restarted following a high discharge pressure trip.

If no condition is found, then at step 406 the compensator valve 126 may remain open. The liquid refrigerant may enter the charge compensator reservoir 124 due to high pressure in the liquid line 114. The liquid refrigerant may leave the charge compensator reservoir 124 due to gravity when the pressure in the liquid line 114 decreases.

If at least one condition is found, at step 408, after a set amount of time the controller 105 may close the compensator valve 126. This set amount of time may range from five to sixty seconds. The charge compensator apparatus 101 may enter the configuration 200B. The compensator valve 126 may close off any liquid refrigerant currently in the charge compensator reservoir 124. At step 410, the controller 105 may reopen the compensator valve 126 after another set amount of time. This set amount of time may range from one to sixty minutes. Alternately, the controller 105 may reopen the compensator valve 126 when the condition indicating a likelihood of high discharge pressure is no longer present. As another alternative, the controller 105 may reopen the compensator valve 126 when no conditions indicating a likelihood of high discharge pressure are present. As another alternative, the controller 105 may reopen the compensator valve 126 when a call for cooling ends.

When the compensator valve 126 opens, the charge compensator apparatus 101 may enter the configuration 200A. The liquid refrigerant may drain into the liquid line 114. The liquid refrigerant may, therefore, be released back into the vapor compression cycle. After step 406 or step 410, the controller 105 may repeat the method 400. The controller 105 may continue to repeat the method 400 in a loop until HVAC system 100 is shut off.

The size of the charge compensator reservoir 124 may vary depending on the particular HVAC system. The reservoir should be large enough to accommodate the refrigerant removed from vapor compression cycle operation during startup conditions and during high outdoor ambient conditions.

The First Pressure Relief Apparatus 600

Figure 5:
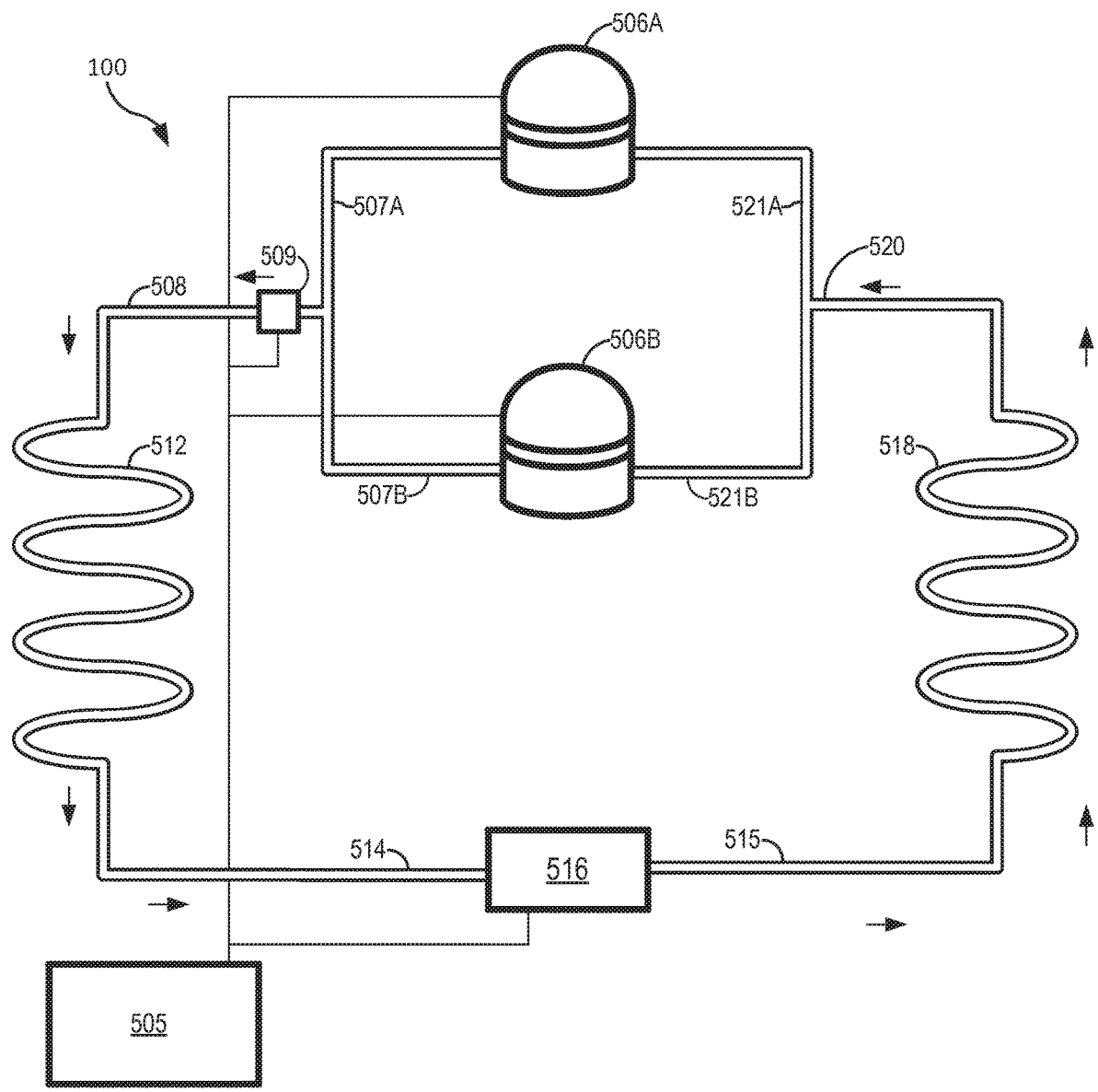
FIG. 5 depicts a block diagram of a second HVAC system.

Referring to FIG. 5, an embodiment of a second HVAC system, the HVAC system 500, is shown. The HVAC system 500 may supply conditioned air to a space. The HVAC system 500 refrigerant may flow in the direction indicated by the arrows of FIG. 5 as part of vapor compression cycle operation. In an embodiment, the HVAC system 500 may be any type of HVAC system, including a heat pump, a variable refrigerant flow system, a split system, and the like. The HVAC system 500 may be used in residential and commercial buildings, and in refrigeration. The HVAC system 500 is not necessarily capable of all of heating, ventilation, and air conditioning.

The HVAC system 500 may include a controller 505, a compressor 506A, a compressor 506B, a sensor 509, a condenser 512, a metering device 516, and an evaporator 518, as well as the refrigerant piping shown. In alternative embodiments, the HVAC system 500 may include additional or fewer components than shown in the embodiment of FIG. 5. For example, in an alternative embodiment, the HVAC system 500 may include: additional, or fewer, compressors 506; additional, or fewer, condensers 512 and/or evaporators 518, such as in a Variable Refrigerant Flow (VRF) system; additional metering devices 516, and the like.

Additionally, or alternatively, in an embodiment, the HVAC system 500 may include different components than as shown in the embodiment of FIG. 5. For example, the HVAC system 500 may include one or more valves, such as check valves, reversing valves, three way valves, four way valves, and the like for controlling the direction and/or rate of refrigerant flow within the HVAC system 500. In an embodiment, the HVAC system 500 may be implemented with a component configuration having one or more features, components, and/or characteristics substantially the same as, or similar, to those of the HVAC system 100 embodiments described above. Those of ordinary skill in the art will appreciate that corresponding changes to the piping arrangement of the HVAC system 500 may be provided to accommodate the features, functions, and components of such alternative embodiments of the HVAC system 500.

The HVAC system 500 may include the controller 505 for controlling the HVAC system 500 components in response to user input, demands of the conditioned space, sensed operating conditions, logic that may be stored within the controller 505, and the like. The controller 505 may energize, de-energize, or configure components of the HVAC system 500 to meet the demands of the conditioned space. For example, the controller 505 may selectively energize system components such as valves to control the direction and path of refrigerant flow through the HVAC system 500. The controller 505 may operably couple to the HVAC system 500 components via a wired or wireless connection. In an embodiment, the controller 505 may be a separate component within the HVAC system 500. Alternatively, in an embodiment, the controller 505 may be incorporated into a thermostat located within the conditioned space.

The controller 505 may be implemented with a memory and a processor for storing and executing logic for controlling the HVAC system 500. The controller 505 may be implemented with hardware, software, or firmware. The controller 505 may be provided with a volatile or non-volatile memory of any known type commonly used in HVAC systems. The controller 505 may store computer executable instructions within a memory and may be provided with a processor for executing stored computer executable instructions. The computer executable instructions may be included in computer code.

The controller 505 may be provided with a processor of any known type commonly used in HVAC systems. The processor may be a single device or combinations of devices, such as associated with a network or distributed processing. The controller 505 may be responsive to or operable to execute instructions stored as part of software, hardware, integrated circuits, firmware, micro-code or the like. The functions, acts, methods or tasks performed by the controller 505, as described herein, may be performed by a processor executing instructions stored in a memory. The instructions are for implementing the processes, techniques, methods, or acts described herein.

The controller 505 may receive data, which may comprise signals, from one or more remote sensing devices. The data received by the controller 505 may be received directly from one or more remote sensing devices, or, may be received indirectly through one or more intermediate devices such as a signal converter, a processor, an input/output interface, an amplifier, a conditioning circuit, a connector, and the like.

Referring to FIG. 5, in an embodiment, the HVAC system 500 may include the compressors 506A, B for compressing refrigerant as part of vapor compression cycle operation. The compressors 506A, B may be compressors of any type comprising the prior art, such as reciprocating compressors, scroll compressors, and the like. The compressors may be single speed or variable speed compressors. The compressors 506A, B may be selectively energized in response to demands on the HVAC system 500 for heating, or cooling, supply air. The compressors 506A, B may operatively couple to the controller 505 via a wired or wireless connection.

As shown in the embodiment of FIG. 5, the compressors 506A, B may be configured for tandem operation. The tandem compressors 506A, B may "share" refrigerant piping with both of the compressors 506A. B included within a single circuit of vapor compression cycle components. The compressors 506A, B may both receive refrigerant via a common suction pipe 520 and may both discharge compressed refrigerant to a common discharge pipe 508. The common suction pipe 520 may split to form the suction pipe legs 521A, B. The suction pipe legs 521A, B may couple to suction ports of the compressors 506A, B, respectively. The common discharge pipe 508 may be formed from the merging of the discharge pipe legs 507A. B. The discharge pipe legs 507A. B may couple to discharge ports of the compressors 506A. B, respectively. The common discharge pipe 508 may route the pressurized refrigerant to the condenser 512.

As shown in FIG. 5, in an embodiment, the HVAC system 500 may include the sensor 509 for sensing one or more parameter values indicating a condition of the HVAC system 500 refrigerant. The sensor 509 may couple to the common discharge pipe 508. In an embodiment, the sensor 509 may sense one or more pressure values of the HVAC system 500 refrigerant within the common discharge pipe 508. In such an embodiment, the sensor 509 may function as a high pressure switch, interrupting power to one or both of the compressors 506A. B in response to over-pressurization of the refrigerant within the common discharge pipe 508. Alternative embodiments of the HVAC system 500 may not include the sensor 509.

In an embodiment, the sensor 509 may operate independent of control by, or communication with, the controller 505. In such an embodiment, the sensor 509 may operate in response to the HVAC system 500 refrigerant pressure, or pressures, interrupting one or more power signals to de-energize the compressors 506A and/or 506B in response to the existence of an over-pressurization condition. Alternatively, in an embodiment, the sensor 509 may connected to the controller 505 via a wired or wireless connection and may communicate sensed data to the controller 505. In such an embodiment, the controller 105 may de-energize one or more compressors 506A and/or 506B in response to reception of a signal transmitted by the sensor 509 and indicating the existence of an over-pressurization condition within the HVAC system 500.

The sensor 509 may transmit analog or pneumatic signals either directly, or indirectly, to the controller 505. In such an embodiment, the signals transmitted by the sensor 509 may be converted to digital signals prior to use by the controller 505. Alternatively, in an embodiment, the sensor 509 may transmit digital signals to the controller 505. In such an embodiment, the digital signals transmitted by the sensors 509 may be processed prior to use by the controller 505 to convert the signals to a different voltage, to remove interference from the circuits, to amplify the signals, or other similar forms of digital signal processing. For each alternative described, herein, the signals of the sensor 509 may be transmitted to the controller 505 directly or indirectly, such as through one or more intermediary devices.

In alternative embodiments, the HVAC system 500 may be provided with additional sensing devices for sensing parameter values indicating conditions of the HVAC system 500 refrigerant, outdoor ambient air, indoor return air, and the like. The sensing devices may be configured to sense temperature, pressure, flow rate, relative humidity, and other like parameter values. Additional sensing devices may be disposed within the HVAC system 500 at the condenser 512, at the evaporator 518, at the metering device 516, within the conditioned space, and/or coupled to refrigerant piping. The additional sensing devices provided may connect to, and communicate with, the controller 505 or, alternatively, may operate independent of the controller 505, as described above. Those of ordinary skill in the relevant art will appreciate that some of the control methods described herein will not require use of any sensing devices, such as the sensor 509, while other control methods, alternatively, may require that the HVAC system 500 be provided with one or more sensing devices, such as the sensor 509, for use in implementing of the control method, or methods, as shown or described, herein.

As shown in FIG. 5, in an embodiment, the HVAC system 500 may include the condenser 512. In an embodiment, the condenser 512 may be a heat exchanger of any known type commonly used in HVAC systems such as a fin-and-tube heat exchanger coil, a microchannel heat exchanger coil, and the like. In an embodiment, the HVAC system 500 may be provided with one or more condensers 512. In an embodiment, the condenser 512 may comprise one or more of the features, functions, and/or characteristics of the outdoor heat exchanger 112, described above. Additionally, or alternatively, the condenser 512 may comprise one or more of the features, functions, and/or characteristics of the indoor heat exchanger 118, described above.

According to the embodiment shown in FIG. 5, the condenser 512 may couple with, and receive the HVAC system 500 refrigerant from the common discharge pipe 508. The HVAC system 500 refrigerant received by the condenser 512 may be at a relatively high pressure and temperature. Further, the HVAC system 500 refrigerant received by the condenser 512 may be primarily gaseous phase refrigerant. The received HVAC system 500 refrigerant may be routed through one or more refrigerant piping tubes of the condenser 512, making one or more passes through the condenser 512. Cooling air may be pulled, or drawn over the condenser 512. The HVAC system 500 refrigerant within the condenser 512 may reject heat to air passing over the condenser 512.

In an embodiment, the HVAC system 500 condenser 512 may be located in an outdoor unit of the HVAC system 500. In such an embodiment, the air flow over the condenser 512 may be ambient outdoor air which may be at an ambient air temperature. An HVAC system 500 in which the condenser 512 is located in an outdoor unit and cooled by outdoor ambient air may provide cooling supply air to a conditioned space. The HVAC system 500 may be a cooling-only unit or, alternatively, may be a heat pump unit operating in cooling mode. Alternatively, the condenser 512 may be located in an indoor unit of the HVAC system 500. In such an embodiment, the air flow over the condenser 512 may comprise a mixture of return air from within the conditioned space and outdoor ventilation air. The HVAC system 500 refrigerant passing through the condenser 512 when located within an indoor unit may reject heat to the mixture of air passing over the condenser. The HVAC system 500 having an indoor condenser 512 may provide heating supply air to the conditioned space. The HVAC system 500 may be a heating-only unit or, alternatively, may be a heat pump unit operating in heating mode.

The indoor or outdoor unit in which the condenser 512 is disposed may include upstream and downstream areas. Upstream areas may be those in which cooling air flow which has not yet passed over the condenser 512 is present. Downstream areas may be those in which cooling air flow which has already passed over the condenser 512 is present. During operation of the HVAC system 500, downstream areas may, therefore, be warmer than upstream areas since the cooing air flow over the condenser 512 may receive heat rejected from the HVAC system 500 refrigerant as it passes over the condenser 512.

Regardless of the condenser 512 location, gaseous refrigerant flowing within the condenser 512 may condense, changing from the gaseous to the liquid phase, as part of vapor compression cycle operation. Importantly, the HVAC system 500 refrigerant leaving the condenser 512 may be high pressure, high temperature liquid refrigerant. This high pressure, high temperature liquid refrigerant may be routed to the metering device 516 via the high pressure liquid pipe 514.

The metering device 516 may throttle the refrigerant flow of the HVAC system 500. The metering device 516 may be disposed between the condenser 512 and the evaporator 518 of the HVAC system 500, as part of vapor compression cycle operation. In an embodiment, the metering device 516 may be any type of metering device comprising the prior art, including thermal expansion valves (TXVs), short orifices, electronic expansion valves (EXVs), and the like. The operation of such metering devices is well known to those of ordinary skill in the art and is, thus, omitted from this description.

According to the HVAC system 500 embodiment shown, a single metering device 516 is provided. In an alternative embodiment, more than one metering device 516 may be provided. For example, additional metering devices may be provided in an HVAC system configured to operate as a multi-stage, heat pump. VRF, and/or other HVAC system type.

In embodiments of the HVAC system 500 configured for heat pump operation, for example, two metering devices 516 may be provided. In such embodiments, the metering devices 516 provided may comprise one or more features, functions, and/or characteristics of the respective expansion devices 116A, B of the HVAC system 100, described above. Further, in such an embodiment, the HVAC system 500 may be provided with a reversing valve, an additional pair of liquid pipes 514, 515, and one or more check valves. These additional components may be used to control the refrigerant flow path through the HVAC system 500. The reversing valve may comprise one or more features, functions, and characteristics substantially the same as those of the reversing valve 110 of the HVAC system 100, described above. The reversing valve may be a four way valve configured to change the direction of refrigerant flow within the HVAC system 500. The check valves may couple to the refrigerant piping and may be disposed immediately adjacent to a metering device 516 for selectively permitting or preventing, refrigerant flow through one or more of the metering devices 516, as desired. The check valves may be solenoids, flow control valves, three-way valves, four way valves, or the like. The reversing valve and check valves may operatively couple to the controller 505 via wired or wireless connections. The controller 505 may control the positions of the reversing valve and check valves to control the direction and path of refrigerant flow within the heat pump system.

According to the embodiment shown in FIG. 5, the HVAC system 500 refrigerant may flow through the metering device 516 from the condenser 512 to the evaporator 518. The metering device 516 may couple with, and receive high temperature and pressure liquid refrigerant from, the high pressure liquid pipe 514. The metering device 516 may also couple with, and deliver low pressure liquid refrigerant to, the low pressure liquid pipe 515. In an embodiment, the metering device 516 may be operably coupled to the controller 505 via a wired or wireless connection. In such embodiments, the controller 505 may control the metering device 516 in response to operating conditions of the HVAC system 500. Alternatively, the metering device 516 may be configured to operate in response to conditions within the HVAC system 500 independent of the controller 505.

Referring to the embodiment of FIG. 5, the portion of the HVAC system 500 extending from the discharge of the compressors 506A. B to the metering device 516 may be described as the high pressure side of the HVAC system 500. High pressure gaseous phase refrigerant may be present within the discharge pipe legs 507A, B and within the common discharge pipe 508. The high pressure refrigerant may condense to high pressure liquid phase refrigerant as it passes through the condenser 512. High pressure liquid phase refrigerant may be present within the high pressure liquid pipe 514. Importantly, high refrigerant pressures within the HVAC system 500, including high discharge pressures at the compressors 506A, B may manifest as higher than normal refrigerant pressures throughout the high pressure side of the HVAC system 500.

As shown in FIG. 5, in an embodiment, the HVAC system 500 may include the evaporator 518. The evaporator 518 may be a heat exchanger. In an embodiment, the evaporator 518 may be a heat exchanger of any known type commonly used in HVAC systems such as a fin-and-tube heat exchanger coil, a microchannel heat exchanger coil, and the like. In an embodiment, the HVAC system 500 may be provided with one or more evaporators 518. In an embodiment, the evaporator 518 may comprise one or more of the features, functions, and/or characteristics of the indoor heat exchanger 118, described above. Additionally. or alternatively, the evaporator 518 may comprise one or more of the features, functions, and/or characteristics of the outdoor heat exchanger 112, described above.

According to the embodiment shown in FIG. 5, the evaporator 518 may couple with, and receive the HVAC system 500 refrigerant from the low pressure liquid pipe 515. The HVAC system 500 refrigerant received by the evaporator 518 may be at a relatively low pressure and temperature. Further, the HVAC system 500 refrigerant received by the evaporator 518 may be mostly liquid phase refrigerant. The HVAC system 500 refrigerant received may flow through the evaporator 518. Air flow may pass over the evaporator 518 and may reject heat to the HVAC system 500 refrigerant flowing through the evaporator 518.

In an embodiment, the HVAC system 500 evaporator 518 may be located in an indoor unit of the HVAC system 500. In such an embodiment, the air flow over the evaporator 518 may comprise a mixture of return air from within the conditioned space and ventilation air. The HVAC system 500 of the present embodiment may be configured to provide cooling supply air to the conditioned space. In such an embodiment, the HVAC system 500 may be a cooling-only unit or, alternatively, may be a heat pump unit operating in cooling mode. Alternatively, in an embodiment, the evaporator 518 may be located in an outdoor unit of the HVAC system 500. In such an embodiment, the air flow over the evaporator 518 may comprise ambient outdoor air which may be at an ambient air temperature. An HVAC system 500 in which the evaporator 518 is located in an outdoor unit and warmed by outdoor ambient air may provide heating supply air to a conditioned space. The HVAC system 500 may be a heating-only unit or, alternatively, may be a heat pump unit operating in heating mode.

Regardless of the evaporator 518 location, liquid refrigerant flowing within the evaporator 518 may boil, changing from the liquid to the gaseous phase, as part of vapor compression cycle operation. Gaseous refrigerant may be routed to the respective compressors 506A. B via the common suction pipe 520 and the respective suction pipe legs 521A, B to complete the refrigerant flow cycle within the HVAC system 500.

Figure 6:
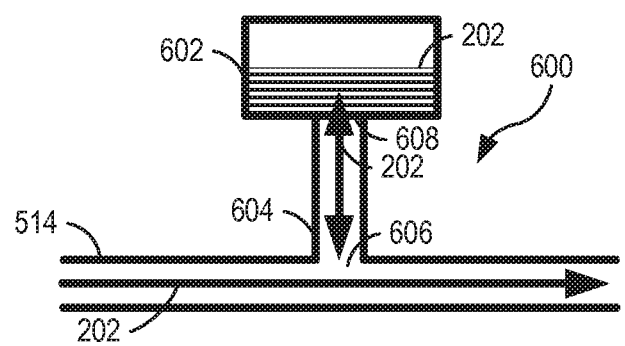
FIG. 6 depicts a first pressure relief apparatus.

Referring now to FIG. 6, a first pressure relief apparatus 600 is shown. The first pressure relief apparatus 600 may be implemented within the HVAC system 500 for reducing one or more HVAC system 500 refrigerant pressures. According to the embodiment shown, the first pressure relief apparatus 600 may comprise a receptacle 602 and a lower relief tube 604. In alternative embodiments, the first pressure relief apparatus 600 may include fewer, additional, or different components than those shown. In an embodiment, the first pressure relief apparatus 600 may comprise one or more functions, components, and characteristics substantially the same as, or similar to, those of the charge compensator apparatus 101, described above. Further, in an embodiment, the first pressure relief apparatus 600 may operate to reduce the HVAC system 100 refrigerant pressure, or pressures, substantially in the manner described above in reference to the charge compensator apparatus 101 while the charge compensator apparatus 101 is in the configuration 200A.

As shown, the first pressure relief apparatus 600 may include the receptacle 602, which may comprise a container for receiving and/or storing a portion of the HVAC system 500 refrigerant. The receptacle 602 may include an open internal volume which may be accessed via one or more openings through a surface of the receptacle 602. The receptacle 602 may receive high temperature, high pressure gaseous phase or liquid phase refrigerant. In an embodiment, therefore, the receptacle 602 may be composed of a material capable of withstanding high internal pressures exerted by the HVAC system 500 refrigerant that may be contained within the receptacle. For example, in an embodiment, the receptacle 602 may be composed of steel. In alternative embodiments, the receptacle 602 may, instead, be composed of any metal, plastic, ceramic, or composite suitable to perform the functions of the receptacle 602, as described herein, while withstanding exposure to high pressure, high temperature gaseous and liquid phase refrigerant that may migrate into the receptacle 602.

As shown, the first pressure relief apparatus 600 may include the lower relief tube 604, which may comprise a length of tubing for operatively connecting the receptacle 602 to the refrigerant piping of the HVAC system 500. The lower relief tube 604 may provide a means of access through which the HVAC system refrigerant may migrate into, or drain from, the receptacle 602 in response to pressure changes of refrigerant within the HVAC system 500. The lower relief tube 604 may be a substantially straight section of tubing having a uniform profile. In alternative embodiments, the lower relief tube 604 may have a configuration different from that shown in the embodiment of FIG. 6. In an alternative embodiment, for example, the lower relief tube 604 may have a non-uniform profile and/or may be configured to extend along a path having one or more bent or curved sections.

In an embodiment, as shown, the lower relief tube 604 may include the lower joint 606 and the upper joint 608 which may be disposed at opposite ends of the lower relief tube 604. In an alternative embodiment, the lower relief tube 604 may include additional upper and/or lower joints 606, 608. The lower joint 606 and the upper joint 608 may each comprise a brazed connection. Alternatively, the lower joint 606 and the upper joint 608, respectively, may comprise welded connections, adhesion connections, heat shrink connections, or some other similar type of non-detachable connection method suitable for providing a sealed connection capable of withstanding stresses caused by high pressure, high temperature refrigerant within the HVAC system 500.

During HVAC system 500 operation, including at start up, the first pressure relief apparatus 600 may operate to reduce the HVAC system 500 refrigerant pressure, or pressures. Specifically, according to the embodiment of FIG. 6, a portion of the HVAC system 500 refrigerant may migrate into the receptacle 602 via the lower relief tube 604 at startup, or at any time during the HVAC system 500 operation, in response to high refrigerant pressure, or pressures, within the HVAC system 500. The portion of the HVAC system 500 refrigerant received by, and/or stored within, the receptacle 602 may be inactive refrigerant. The inactive HVAC system 500 refrigerant may be effectively removed from vapor compression cycle operation within the HVAC system 500. The refrigerant flowing within the HVAC system 500 piping as part of vapor compression cycle operation may comprise the active HVAC system 500 refrigerant.

The first pressure relief apparatus 600 may reduce refrigerant pressures within the HVAC system 500 by allowing for a decrease in the quantity of active refrigerant within the HVAC system 500. The maximum capacity of pressure reduction provided by the first pressure relief apparatus 600 may vary directly with the quantity of refrigerant that may be contained within the first pressure relief apparatus 600. Increasing the size of the receptacle 602 may provide a greater internal volume, allowing for a greater reduction in the amount of active refrigerant remaining with the HVAC system 500, and allowing for a greater maximum reduction in HVAC system 500 refrigerant pressures. The removal of active refrigerant from an HVAC system may adversely affect performance of the HVAC system, however, since the heating, or cooling, capacity of an HVAC system may correspond to the amount of active refrigerant present in the HVAC system. It may be desirable, therefore, to provide the first pressure relief apparatus 600 with a component configuration that may resist accumulation of inactive refrigerant within the first pressure relief apparatus 600 during normal operation of the HVAC system 500.

The first pressure relief apparatus 600 may be disposed at a location within the high pressure side of the HVAC system 500 piping. As shown in FIG. 6, for example, the first pressure relief apparatus 600 may couple to the high pressure liquid pipe 514 of the HVAC system 500 via the lower joint 606 at a location between the condenser 512 and the metering device 516. The lower relief tube 604 may couple to the receptacle 602 at the upper joint 608. Importantly, the upper joint 608 may be disposed at a position that is vertically higher than the lower joint 606, as shown. Further, the lower relief tube 604 may couple to the receptacle 602 substantially at, or proximal to, a bottom surface of the receptacle 602.

The first pressure relief apparatus 600, configured as shown, may provide several functional advantages. For example, the relative positioning of the first pressure relief apparatus 600 components may provide some resistance to migration of refrigerant into the receptacle 602. More specifically, the force of gravity may provide some resistance to migration of active refrigerant from the high pressure liquid pipe 514 into the first pressure relief apparatus 600. The resistance provided by gravity may be overcome only at times when relatively high refrigerant pressures are present within the high pressure liquid pipe 514 of the HVAC system 500. Additionally, gravity may promote draining of inactive HVAC system refrigerant from the receptacle 602 and into the high pressure liquid pipe 514 as relatively high refrigerant pressures within the high pressure liquid pipe decrease following the occurrence of high pressures within the HVAC system 500. Advantageously, the relative positions of the first pressure relief apparatus 600 components may maintain the HVAC system 500 heating or cooling capacity at high levels by resisting migration of refrigerant into the receptacle 602 during times when high pressures are not present within the HVAC system 500.

Further, the location of the lower joint 606 within the HVAC system 500 piping, as shown, may enhance the first pressure relief apparatus 600 capacity for refrigerant pressure reduction. As shown, the lower joint 606 may couple to the high pressure liquid pipe 514. Importantly, refrigerant flow within the high pressure liquid pipe 514, as described above, may comprise of liquid phase refrigerant. When positioned as shown in FIG. 6, the first pressure relief apparatus 600 may receive liquid phase refrigerant during times of high refrigerant pressure, or pressures, within the HVAC system 500. Reception of liquid phase refrigerant, as opposed to gas phase refrigerant, within the first pressure relief apparatus 600 may allow for a greater quantity of inactive refrigerant to be received from the HVAC system 500, allowing for a greater reduction in refrigerant pressure, or pressures, within the HVAC system 500.

In an embodiment, the receptacle 602 may be disposed substantially at the condenser 512 and within the indoor, or outdoor, unit of the HVAC system 500. More specifically, the receptacle 602 may be disposed "downstream" of the condenser 512. In alternative embodiments, the first pressure relief apparatus 600 may be located "upstream" of the condenser 512, "upstream" of the evaporator 518, or "downstream" of the evaporator 518. Of these locations, "downstream" of the condenser 512 may be the warmest of these possible locations.

Advantageously, placing the receptacle 602 at a location "downstream" of the condenser 512 may enhance performance of the first pressure relief apparatus 600. The receptacle 602, when disposed at a "downstream" location within the unit within which the condenser 512 is disposed, may bathe in the warmed "downstream" air flow. The warmed air flow may maintain refrigerant within the receptacle 602 at a high pressure, which may provide some resistance to migration of active refrigerant to the receptacle 602. As such, greater active refrigerant pressure may be required to cause refrigerant to migrate into the receptacle 602. Advantageously, with the receptacle 602 disposed "downstream" of the condenser 512, refrigerant may only migrate into the receptacle 602 during times of high active refrigerant pressures within the HVAC system 500 and, further, may drain from the receptacle 602 sooner as the active refrigerant pressure decreases from a high pressure condition.

As shown in FIG. 6, the first pressure relief apparatus 600 may fill or drain during operation of the HVAC system 500 in response to the pressure of the active refrigerant within the HVAC system 500. The HVAC system 500 refrigerant 202 flowing within the high pressure liquid pipe 514 may migrate into, or drain from, the receptacle 602 during HVAC system 500 operation in a manner similar to that described above, in reference to the liquid line charge compensator apparatus 101 when in the configuration 200A.

Briefly, high refrigerant pressure within the high pressure liquid pipe 514 may cause the HVAC system 500 refrigerant 202 within the high pressure liquid pipe 514 to overcome gravity and internal pressures within the receptacle 602 and migrate into the receptacle 602 via the lower relief tube 604. The migrating refrigerant 202 may become inactive refrigerant upon migration into the first pressure relief apparatus 600. The amount of active HVAC system 500 refrigerant may be reduced, which may result in a reduction of refrigerant pressure, or pressures, within the active portions of the HVAC system 500. The refrigerant pressure reduction caused may be sufficient to allow for continued operation of the HVAC system 500, avoiding the occurrence of a high discharge pressure trip in response to a detected overpressurization condition within the HVAC system 500.

During continued operation of the HVAC system 500, the refrigerant pressure, or pressures, within the active portions of the HVAC system 500 may decrease. The decrease in the HVAC system 500 refrigerant pressure, or pressures, during continued operation may result from normalizing of the HVAC system 500 operation in response to current conditions, such as the opening of the metering device 516 in response to pressure buildup on the high pressure side of the HVAC system 500, for example. Additionally, or alternatively, changing operating conditions, such as a decrease in demand or a reduction of the outdoor ambient temperature may lead to decreases in the HVAC system 500 refrigerant pressure, or pressures, during continued operation. In any event, as the refrigerant pressure decreases, the inactive HVAC system 500 refrigerant may drain from the receptacle 602 due to gravity and internal pressures within the receptacle 602, returning to within the high pressure liquid pipe 514.

The Second Pressure Relief Apparatus 700

Figure 7:
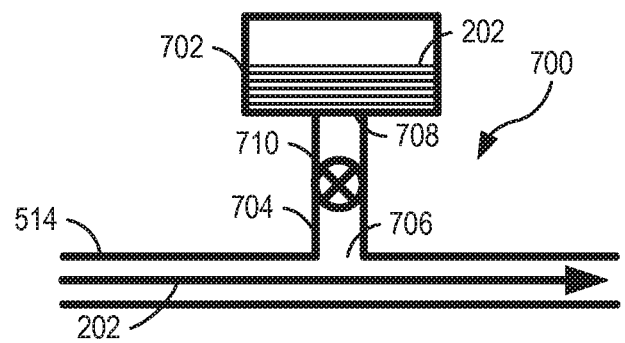
FIG. 7 depicts a second pressure relief apparatus.

Referring now to FIG. 7, a second pressure relief apparatus 700 for reducing refrigerant pressure within an HVAC system is shown. The second pressure relief apparatus 700 may be implemented within the HVAC system 500. According to the embodiment shown, the second pressure relief apparatus 700 may comprise a receptacle 702, a lower relief tube 704, and a valve 710. In alternative embodiments, the second pressure relief apparatus 700 may include fewer, additional, or different components than those shown.

In an embodiment, the second pressure relief apparatus 700 may comprise one or more features, functions, and/or characteristics substantially the same as, or similar to, those of the first pressure relief apparatus 600, as described above, and may be additionally provided with the valve 710. Specifically, the receptacle 702 of the second pressure relief apparatus 700 may comprise a container for receiving high pressure refrigerant from the HVAC system 500 and may comprise one or more features, functions, and/or characteristics substantially the same as, or similar to, those of the receptacle 602. Further, the lower relief tube 704 may comprise a length of tubing for connecting the receptacle 602 to the piping of the HVAC system 500 and may comprise one or more features, functions, and/or characteristics substantially the same as, or similar to, those of the lower relief tube 604. Additionally. or alternatively, in an embodiment, the second pressure relief apparatus 700 may comprise one or more features, functions, and/or characteristics substantially the same as, or similar to, those of the liquid line charge compensator apparatus 101, described above. Specifically, the second pressure relief apparatus 700 may include the valve 710 which may couple to the lower relief tube 704 for selectively permitting, or preventing, active refrigerant from accessing the second pressure relief apparatus 700. The valve 710 may be closed to prevent active refrigerant from migrating into the receptacle 702 or to prevent inactive refrigerant from draining from the receptacle 702. In an embodiment, the valve 710 may comprise one or more features, functions, and/or characteristics substantially the same as, or similar to, those of the valve 310 of the liquid line charge compensator apparatus 101.

In an embodiment, the controller 105 may control the valve 710, switching the valve 710 between open and closed positions. The valve 710 may be operably coupled to the controller 505 via a wired or wireless connection. The controller 505 may control the valve 710 position in response to sensed, or detected, conditions within the HVAC system 500. In an embodiment, the valve 710 may be a solenoid valve. Alternatively, in an embodiment, the valve 710 may be a check valve, a flow control valve, a three-way valve, a four way valve, or the like.

In an embodiment, the valve 710 may be configured for normally open operation. If configured for normally open operation, the valve 710 may remain in the open position, permitting flow of refrigerant through the lower relief tube 704 unless and until the valve 710 receives a control signal switching the valve 710 to the closed position. The valve 710 may remain in the closed position only at times when the control signal is received. Alternatively, in an embodiment, the valve 710 may be configured for normally closed operation. If configured for normally closed operation, the valve 710 may remain in the closed position, preventing flow of refrigerant through the lower relief tube 704 unless and until the valve 710 receives a control signal switching the valve 710 to the open position. The valve 710 may remain in the open position only at times when the control signal is received.

When implemented with the HVAC system 500, as shown in FIG. 7, the second pressure relief apparatus 700 may be operated by the controller 505 to reduce the HVAC system 500 refrigerant pressure, or pressures, in a manner substantially the same as, or similar to, that described above in reference to the liquid line charge compensator apparatus 101 and the methods 300, 400. For example, during HVAC system 500 operation, including at startup, the valve 710 may be set to the open position to permit migration of active refrigerant into the receptacle 702, or to permit draining of inactive refrigerant from the receptacle 702, via the lower relief tube 704. While the valve 710 is open, high refrigerant pressure within the high pressure liquid pipe 514 may cause active refrigerant to migrate into the receptacle 702. While the valve 710 remains open, relatively low refrigerant pressure in the high pressure liquid pipe 514 may cause inactive refrigerant to drain from the receptacle 702 and back into the high pressure liquid pipe 514. Further, at times during the HVAC system 500 operation following detection of an over-pressurization condition, the controller 505 may set the valve 710 to the closed position after a period of time to prevent draining of inactive refrigerant from the receptacle 702, via the lower relief tube 704.

Referring to FIG. 4, the method 400 may be implemented by the controller 505 in an HVAC system 500 provided with the second pressure relief apparatus 700. According to the method 400, active refrigerant may be removed from the HVAC system 500 and stored with the receptacle 702 to reduce the refrigerant pressure with the HVAC system 500. The method 400 may be performed when HVAC system 500 is started. Additionally, or alternatively, the method 400 may be performed periodically or continuously during operation of the HVAC system 500. In an alternative embodiment, the method 400 may include additional, fewer, or different steps than those shown.

At the step 402, the controller 505 may set the valve 710 to the open position. In an embodiment, the controller 505 may set the valve 710 to the open position in response to reception of a triggering input. In such an embodiment, the triggering input may be a demand on the HVAC system 500 requiring energizing of one or more compressors 506A, B. The demand may follow a period of non-operating time of the HVAC system 500 or, alternatively, may follow a period of operating time of the HVAC system 500 according to a different operational configuration, such as when switching between part load and full load operation. Additionally, in an embodiment, the triggering input may comprise control logic executed by the controller 505 as part of normal operation of the HVAC system 500, such as in embodiment in which the method 400 is continuously or periodically executed at times while the HVAC system 500 is operating. In an embodiment, the valve 710 may be a normally open solenoid valve and may already be in the open position prior to execution of the step 402.

The controller 505 may check for a condition indicating a likelihood of one or more high refrigerant pressures within the HVAC system 500 at the step 404. Many possible conditions may be checked for at step 404. One condition may be outdoor ambient temperature being within a certain temperature range, such as between 105° F. and 125° F., for example. Another condition may be a change from part load operation to full load operation of the HVAC system 500 which may require energizing of a previously de-energized compressor 506A, B. Another condition may be the HVAC system 500 being operated following a period of non-operating time of more than a threshold amount of time, such as five minutes, for example. Another condition may be detection of the HVAC system 500 being restarted immediately following a high discharge pressure trip.

If no condition is found at step 404, the controller 505 may leave the valve 710 in the open position at the step 406. In an embodiment, the controller 505 may return to the step 402 to continuously monitor operation of the HVAC system 500. According to such an embodiment, the method 400 may be continuously repeated while the HVAC system 500 is operating in response to a demand. Alternatively, the controller 505 may return to the step 402 only after a period of time elapses, periodically monitoring the HVAC system 500 operation while being operated in response to a demand.

If a condition is found at the step 404, the controller 505 may generate a control signal for closing the valve 710 at step 408. In an embodiment, the controller 505 may wait for a defined period of time to elapse before generating the control signal for closing the valve 710. During this waiting period, the valve 710 may remain open to allow active refrigerant to migrate into the receptacle 702. In an embodiment, the waiting period may be an amount of time within the range of five to sixty seconds. Active liquid refrigerant may migrate into the receptacle 702 via the lower relief tube 704 during the waiting period in response to sufficiently high pressure within the high pressure liquid pipe 514. Upon expiration of the defined waiting period, the controller 505 may command the valve 710 to the closed position to trap inactive refrigerant within the receptacle 702.

At the step 410, the controller 505 may wait a defined amount of time before commanding the valve 710 to return to the open position. In an embodiment, the amount of time may be a period of within time with a range from between about one to 60 minutes. Alternately, the controller 505 may wait at the step 410 until the condition indicating a likelihood of high discharge pressure found at the step 404 is no longer present. As another alternative, the controller 505 may wait until no conditions indicating a likelihood of high discharge pressure, as defined at the step 404, are present within the HVAC system 500. Alternatively, or additionally, the controller 505 may wait until the demand on the HVAC system 500 is met. At the expiration of the defined waiting time, a high pressure condition within the HVAC system 500 may no longer be present and the controller 505 may re-open the valve 710 at the step 410.

With the valve 710 re-opened, the inactive refrigerant stored within the receptacle 702 may drain from the receptacle 702 back into the high pressure liquid pipe 514. In an embodiment, the controller 505 may exit the method 400 and return the HVAC system 500 to normal operation after re-opening the valve 710 at step 410. Alternatively, the controller 505 may return to step 402, repeating execution of the method 400 one or more times while a demand on the HVAC system is present. According to such an embodiment, the method 400 may be continuously repeated while the HVAC system 500 is operating in response to a demand. Alternatively, the controller 505 may return to the step 402 only after a period of time elapses, periodically monitoring the HVAC system 500 operation while being operated in response to a demand.

In a particular embodiment, the HVAC system 500 may be implemented with the second pressure relief apparatus 700 coupled to the high pressure liquid pipe 514. The particular HVAC system 500 embodiment may comprise the compressors 506A, B configured for tandem operation, a microchannel coil condenser 512, and a microchannel coil evaporator 518. Those of ordinary skill in the art will appreciate that an HVAC system 500 according to the particular embodiment described, including both microchannel heat exchangers and tandem compressors, may be especially susceptible to high discharge pressure trips. Tandem compressor operation may cause higher discharge pressures, generally, as two compressors may be operating simultaneously and discharging refrigerant into a common discharge pipe. Additionally, microchannel heat exchanger coils may include many small diameter tubes to maximize surface area exposure between refrigerant tubes of the microchannel coil and the air flow over the coil. As such, the microchannel coil may hold a relatively small quantity of the HVAC system 500 refrigerant, whereby more refrigerant must be disposed within the piping between HVAC system 500 components, causing an increase in refrigerant pressure within the piping.

The controller 505 of the particular HVAC system 500 described may implement the method 400 to prevent refrigerant over-pressurization and high discharge pressure trips during operation. A demand for cooling operation of the particular embodiment of the HVAC system 500 described may be received by the controller 505 while the valve 710 is open. The controller 505 may leave the valve 710 in the open position at the step 402. The controller 505 may check for conditions within the HVAC system 500 that may make the occurrence of high discharge pressure likely at the step 404. The controller 505 may determine that the HVAC system 500 is operating in response to a demand requiring energizing of one, or both, of the tandem compressors 506A. B and may determine that a condition likely to cause high discharge pressure exists at the step 404.

Upon finding that a condition likely to cause high discharge pressure exists within the HVAC system 500, the controller 505 may maintain the valve 710 in the open position for sixty seconds before commanding the valve to the closed position at the step 408. During the waiting period, a portion of the active refrigerant within the HVAC system 500 may migrate into the receptacle 702 in response to relatively high refrigerant pressures within the high pressure liquid pipe 514. Inactive refrigerant may collect within the receptacle 702, causing a reduction of one or more refrigerant pressures within the HVAC system 500. Inactive refrigerant may be trapped within the receptacle 702 upon the closing of the valve 710 at the step 408.

The controller 505 may maintain the valve 710 in the closed position for a period of time at the step 410 before re-opening the valve 710. The HVAC system 500 may continue to operate during the waiting period. During continued operation of the HVAC system 500, active refrigerant pressure within the high pressure liquid pipe 514 may normalize through the metering device 516 as it opens. The opening of the metering device 516 may result in a reduction of the refrigerant pressure within the high pressure liquid pipe 514 as more refrigerant is permitted to flow through the metering device 516 and into the low pressure liquid pipe 515.

The controller 505 may reopen the valve 710 at the step 410 upon the expiration of the period of waiting time, allowing inactive refrigerant to drain from the receptacle 702 in response to gravity. The active refrigerant pressure may have reduced, via pressure normalization through the metering device 516, to a sufficiently low level such that the inactive refrigerant may re-enter the high pressure liquid pipe 514. Following re-opening of the valve 710 at the step 410, the controller 505 may return to the step 402, repeating execution of the method 400 while the demand on the HVAC system 500 remains present.

The Third Pressure Relief Apparatus 900

Figure 9:
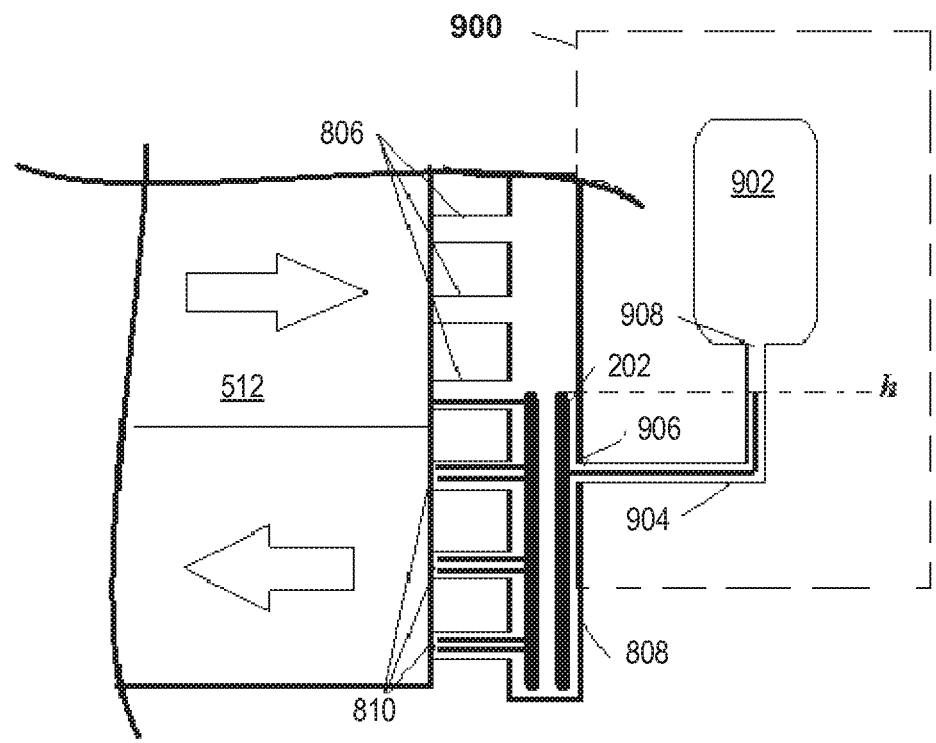
FIG. 9 depicts a third pressure relief apparatus coupled to a heat exchanger within an HVAC system.

Turning now to FIG. 9, a third pressure relief apparatus 900 for reducing refrigerant pressure within an HVAC system is shown. The third pressure relief apparatus 900 may be implemented within the HVAC system 500. According to the embodiment shown, the third pressure relief apparatus 900 may comprise a receptacle 902 and a lower relief tube 904 further comprising a lower joint 906 and an upper joint 908. In alternative embodiments, the third pressure relief apparatus 900 may include fewer, additional, or different components than those shown.

The third pressure relief apparatus 900 may comprise one or more features, functions, and/or characteristics substantially the same as, or similar to, those of the first pressure relief apparatus 600, while being disposed at a different location within the HVAC system 500 than the first pressure relief apparatus 600. Specifically, the receptacle 902 of the third pressure relief apparatus 900 may comprise a container for receiving high pressure refrigerant from the HVAC system 500. The receptacle 902 may comprise one or more features, functions, and/or characteristics substantially the same as, or similar to, those of the receptacle 602. Further, the lower relief tube 904 may comprise a length of tubing operatively connecting the receptacle 902 to the refrigerant piping of the HVAC system 500. The lower relief tube 904 and may comprise one or more features, functions, and/or characteristics substantially the same as, or similar to, those of the lower relief tube 604.

Figure 8:
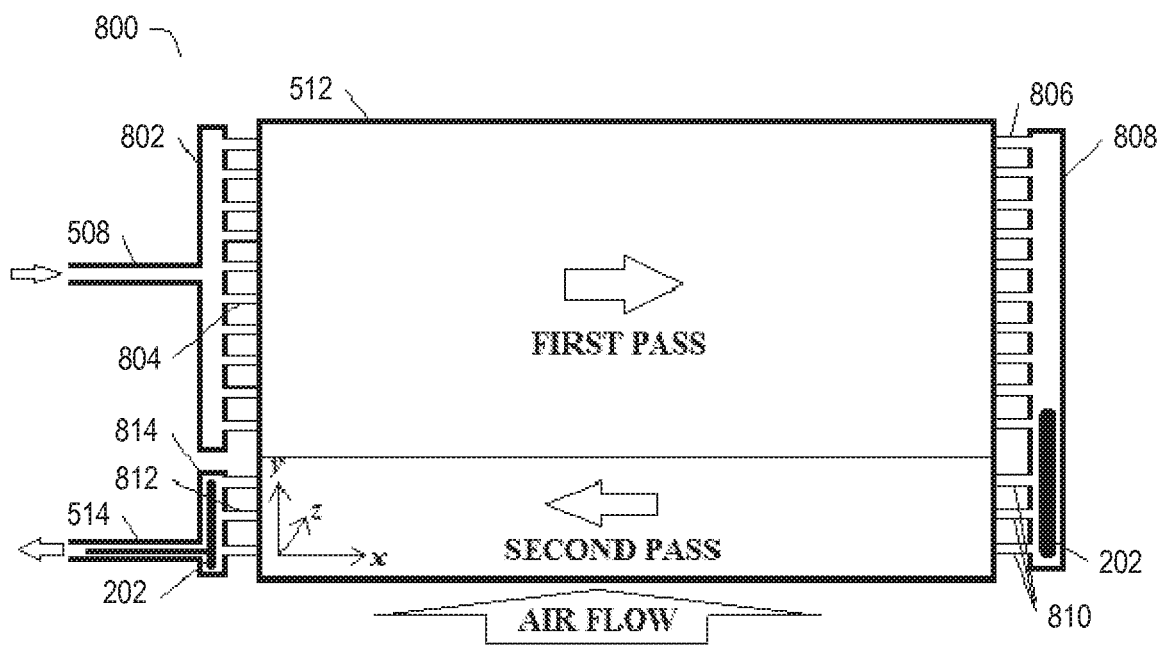
FIG. 8 depicts a heat exchanger within an HVAC system.

Referring to FIGS. 8 and 9, in an embodiment, the third pressure relief apparatus 900 may couple to a heat exchanger assembly 800. The heat exchanger assembly 800 may be implemented within the HVAC system 500 and may comprise the condenser 512. In an embodiment, the heat exchanger assembly 800 may comprise a microchannel heat exchanger. Alternatively, the heat exchanger assembly 800 may comprise a fin-and-tube heat exchanger or some other similar heat exchanger commonly used in HVAC systems. According to the embodiment shown, the heat exchanger assembly 800 may comprise an inlet manifold 802, a plurality of inlet tubes 804, the condenser 512, a plurality of leader tubes 806, 810, a common manifold 808, a plurality of outlet tubes 812, and an outlet manifold 814. In alternative embodiments, the heat exchanger assembly 800 may include fewer, additional, or different components that those shown.

As shown, the heat exchanger assembly 800 may couple to the common discharge pipe 508 of the HVAC system 500 at the inlet manifold 802. The heat exchanger assembly 800 may, therefore, receive high temperature, high pressure gaseous phase refrigerant from the compressors 506A. B as part of vapor compression cycle operation of the HVAC system 500. The refrigerant received from the common discharge pipe 508 may be directed into the plurality of inlet tubes 804. The respective inlet tubes 804 may couple to respective upper refrigerant tubes of the condenser 512, which may extend across the width of the condenser 512. The respective upper refrigerant tubes of the condenser 512 may couple to the respective leader tubes 806 at the end of the condenser 512 opposite the inlet tubes 804.

The portion of the heat exchanger assembly 800 extending from the inlet tubes 804 to the leader tubes 806 may comprise a "first pass" through the heat exchanger assembly 800. As shown in FIG. 8, in an embodiment, the HVAC system 500 refrigerant may flow through the "first pass" portion of the heat exchanger assembly 800 in the x direction while air flow passes over the condenser 512 of the heat exchanger assembly 800 substantially in the z direction.

In an embodiment, the HVAC system 500 refrigerant exiting the "first pass" portion of the heat exchanger assembly 800 may flow into the common manifold 808. The common manifold 808 may route the HVAC system 500 refrigerant received into the leader tubes 810. The leader tubes 810 may couple to additional refrigerant tubes of the condenser 512, which may extend across the width of the condenser 512. The respective lower refrigerant tubes of the condenser 512 may couple to the respective outlet tubes 812 at the end of the condenser 512 opposite the leader tubes 810.

The portion of the heat exchanger assembly 800 extending from the leader tubes 810 to the outlet tubes 812 may comprise a "second pass" through the heat exchanger assembly 800. As shown in FIG. 8, in an embodiment, the HVAC system 500 refrigerant may flow through the "second pass" portion of the heat exchanger assembly 800 in a direction substantially opposite of the x direction shown. The HVAC system 500 refrigerant may exit the "second pass" portion of the heat exchanger assembly 800 and flow into the outlet manifold 814. The HVAC system 500 refrigerant may be routed by the outlet manifold 814 into the high pressure liquid pipe 514, exiting the heat exchanger assembly 800.

The HVAC system 500 refrigerant may condense from the gaseous to liquid phase as it flows through the heat exchanger assembly 800, rejecting heat to the air flow passing over the heat exchanger assembly 800. Importantly, the HVAC system 500 refrigerant may comprise a mixture of gaseous and liquid phase refrigerant at the exit of the "first pass" portion of the heat exchanger assembly 800. The gaseous and liquid phase refrigerant mixture may collect within the common manifold 808. As shown in FIG. 8, higher density liquid phase refrigerant 202 may pool at the lower portions of the common manifold 808. The liquid phase refrigerant 202 may enter the "second pass" portion of the heat exchanger assembly 800 to be sub-cooled before exiting the heat exchanger assembly 800 via the high pressure liquid line 514. The HVAC system 500 refrigerant exiting the heat exchanger assembly 800 may be high temperature, high pressure liquid refrigerant.

Referring to FIG. 9, the liquid phase refrigerant 202 may occupy a portion of the internal volume of the common manifold 808 extending vertically from the bottom of the common manifold 808 to a saturation height, h, of the HVAC system 500 refrigerant within the heat exchanger assembly 800. The saturation height h may be the location along the height of the common manifold (in the y-direction) below which liquid phase refrigerant 202 pools and above which gaseous phase refrigerant is present.

The heat exchanger assembly 800, as described herein, is intended to be illustrative, only, and is provided for the purpose of more clearly describing the relative locations and position of the pressure relief apparatuses described, herein, and below. The particular heat exchanger assembly 800 embodiment shown in FIG. 8 shall not be interpreted as narrowing the scope of the present invention. Those of ordinary skill in the art will appreciate that the heat exchanger assembly 800, in alternative embodiments, may be provided with a component configuration differing from that shown in the embodiment of FIG. 8 while still being capable of accommodating the refrigerant pressure reducing function of the pressure relief apparatuses 900, 1000, 1100, as described herein, and below.

Referring to FIG. 9, in an embodiment, the HVAC system 500 may include the heat exchanger assembly 800 which may be implemented with the third pressure relief apparatus 900 for reducing refrigerant pressure, or pressures, within the HVAC system 500. As shown, the third pressure relief apparatus 900 may couple to the common manifold 808 via the lower joint 906. Importantly, the lower joint 906 may be disposed at a position along the height of the common manifold 808 that may be vertically lower than the saturation height h. In this configuration, the HVAC system 500 refrigerant accessing the lower relief tube 904 may primarily comprise the liquid phase refrigerant 202. As such, the HVAC system 500 refrigerant migrating into the third pressure relief apparatus 900 in response to high refrigerant pressures may be primarily liquid phase refrigerant, as shown. Advantageously, the pressure reducing capacity of the third pressure relief apparatus 900 may be maximized through reception of only higher density liquid refrigerant 202 within the receptacle 902.

As shown in the embodiment of FIG. 9, the third pressure relief apparatus 900 may be disposed on the side of the common manifold 808 opposite the leader tubes 806, 810. Alternatively, in an embodiment, the third pressure relief apparatus 900 may be disposed on any side of the common manifold 808, including on substantially the same side of the common manifold 808 as the leader tubes 806, 810. Importantly, the coupling location of the lower joint 906 and/or the length and shape of the lower relief tube 904 may be configured such that the receptacle 902 may be disposed downstream of the condenser 512. As described above, placement of the receptacle 902 downstream of the condenser 512 may be advantageous since the receptacle 902 may bathe in the heated air flow which has already passed over the condenser 512.

The third pressure relief apparatus 900 may provide for reduction of the HVAC system 500 refrigerant pressure substantially in the manner described, above, in reference to the first pressure relief apparatus 600. The third pressure relief apparatus 900, coupled to the common manifold 808 and having the receptacle 902 located as described, may provide for reduction in active refrigerant within the HVAC system 500 at times when relatively high HVAC system 500 refrigerant pressure, or pressures, are present. The third pressure relief apparatus 900, coupled to the common manifold 808 and having the receptacle 902 located as described, herein, may also, advantageously, avoid migration of the HVAC system 500 refrigerant into the third pressure relief apparatus 900 at times when high refrigerant pressure, or pressures, are not present within the HVAC system 500.

The Fourth Pressure Relief Apparatus 1000

Figure 10:
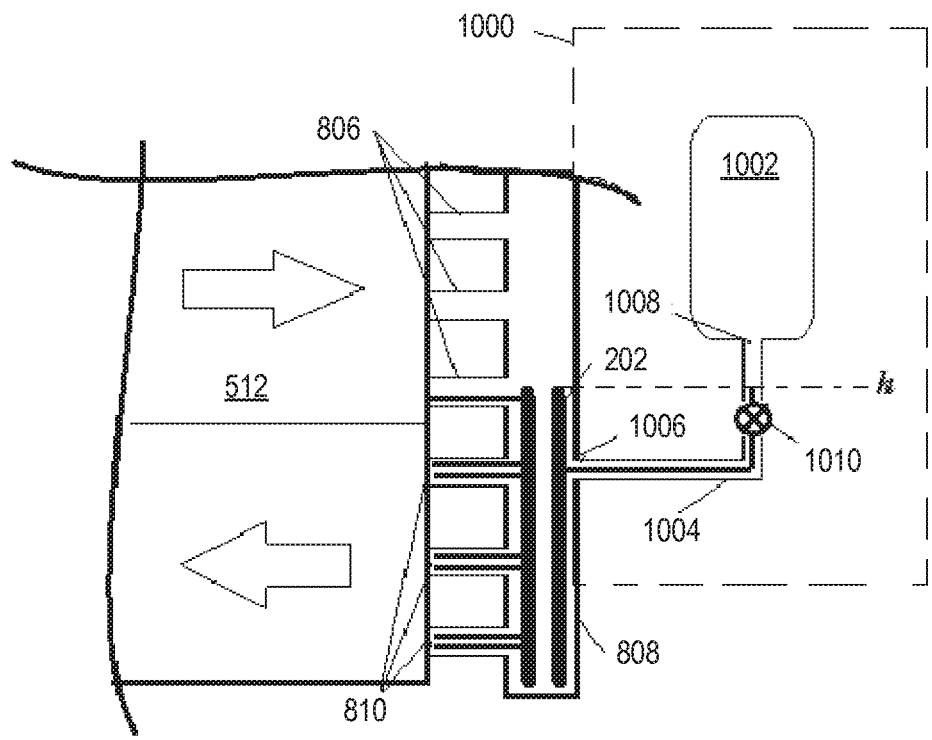
FIG. 10 depicts a fourth pressure relief apparatus coupled to a heat exchanger within an HVAC system.

Referring now to FIGS. 8 and 10, a fourth pressure relief apparatus 1000 for reducing refrigerant pressure, which may be implemented within the HVAC system 500, is shown. According to the embodiment shown, the fourth pressure relief apparatus 1000 may comprise a receptacle 1002, a lower relief tube 1004 comprising a lower joint 1006 and an upper joint 1008, and a valve 1010. In alternative embodiments, the fourth pressure relief apparatus 1000 may include fewer, additional, or different components than those shown.

The fourth pressure relief apparatus 1000 may comprise one or more features, functions, and/or characteristics substantially the same as, or similar to, those of the second pressure relief apparatus 700, as described above, while being disposed at a different location within the HVAC system 500. Specifically, the receptacle 1002 of the fourth pressure relief apparatus 1000 may comprise a container for receiving high pressure refrigerant from the HVAC system 500 which may comprise one or more features, functions, and/or characteristics substantially the same as, or similar to, those of the receptacle 702. Further, the lower relief tube 1004 may comprise a length of tubing for operatively connecting the receptacle 1002 to the refrigerant piping of the HVAC system 500. The lower relief tube 1004 may comprise one or more features, functions, and/or characteristics substantially the same as, or similar to, those of the lower relief tube 704. Additionally, the valve 1010 may couple to the lower relief tube 1004 for selectively permitting, or preventing, active refrigerant from accessing the receptacle 1002. In an embodiment, the valve 1010 may comprise one or more features, functions, and/or characteristics substantially the same as, or similar to, those of the valve 710.

The locations of the fourth pressure relief apparatus 1000 components within the HVAC system 500 may be substantially the same as those described, above, and in reference to the third pressure relief apparatus 900. Specifically, referring to FIGS. 9 and 10, the HVAC system 500 may be provided with the evaporator 512 as part of the heat exchanger assembly 800 and may further be provided with the fourth pressure relief apparatus 1000 for reducing refrigerant pressure within the HVAC system 500. As shown in FIG. 10, the fourth pressure relief apparatus 1000 may couple to the common manifold 808 at the lower joint 1006. Importantly, the lower joint 1006 may be disposed at a position along the height of the common manifold 808 vertically lower than the saturation height h.

As shown in the embodiment of FIG. 10, the fourth pressure relief apparatus 1000 may be disposed on the opposite side of the common manifold 808 of the condenser 512. Alternatively, in an embodiment, the fourth pressure relief apparatus 1000 may be located along any side of the common manifold 808, including being disposed along substantially the same side of common manifold 808 as the condenser 512. Importantly, the coupling location of the lower joint 1006 as well as the length and profile shape of the lower relief tube 1004 may be configured such that the receptacle 1002 is disposed at a "downstream" location of the condenser 512.

When implemented with the HVAC system 500, as shown in FIG. 10, fourth pressure relief apparatus 1000 may be operated by the controller 505 in accordance with the methods 300, 400 to reduce the HVAC system 500 refrigerant pressure, or pressures. Operation of the fourth pressure relief apparatus 1000 in accordance with the methods 300, 400 may be similar to the operation of the second pressure relief apparatus 700. Advantageously, the fourth pressure relief apparatus 1000 may be operable to provide some or all of the functions provided by the respective second pressure relief apparatus 700 and third pressure relief apparatus 900, as described above.

In a particular embodiment, the HVAC system 500 may be implemented with the fourth pressure relief apparatus 1000 coupled to the common manifold 808. The particular HVAC system 500 embodiment may comprise the compressors 506A, B configured for tandem operation, a microchannel coil condenser 512, and a microchannel coil evaporator 518. The controller 505 may operate the fourth pressure relief apparatus 1000 within the particular HVAC system 500 embodiment described in accordance with the method 400.

A demand for cooling operation of the particular embodiment of the HVAC system 500 described may be received by the controller 505 while the valve 1010 is open. The controller 505 may leave the valve 1010 in the open position at the step 402. The controller 505 may check for conditions within the HVAC system 500 that may make the occurrence of high discharge pressure likely at the step 404. The controller 505 may determine that the HVAC system 500 is operating in response to a demand requiring energizing of one, or both, of the tandem compressors 506A, B and may determine that a condition likely to cause high discharge pressure exists at the step 404.

Upon finding that a condition likely to cause high discharge pressure exists within the HVAC system 500, the controller 505 may maintain the valve 1010 in the open position for sixty seconds before commanding the valve 1010 to the closed position at the step 408. During the waiting period, a portion of the active refrigerant within the HVAC system 500 may migrate into the receptacle 1002 in response to relatively high refrigerant pressures within the HVAC system 500, such as within the high pressure side of the HVAC system 500. Inactive refrigerant may collect within the receptacle 1002, reducing the amount of active refrigerant within the HVAC system and causing a reduction of one or more refrigerant pressures within the HVAC system 500. Inactive refrigerant may be trapped within the receptacle 1002 upon the closing of the valve 1010 at the step 408.

The controller 505 may maintain the valve 1010 in the closed position for a defined period at the step 410 before re-opening the valve 1010. In an embodiment, the amount of time may be a period of within time with a range from between about one to 60 minutes. Alternately, the controller 505 may wait at the step 410 until the condition indicating a likelihood of high discharge pressure found at the step 404 is no longer present. As another alternative, the controller 505 may wait until no conditions indicating a likelihood of high discharge pressure, as defined at the step 404, are present within the HVAC system 500. Alternatively, or additionally, the controller 505 may wait until the demand on the HVAC system 500 is met. At the expiration of the defined waiting time, a high pressure condition within the HVAC system 500 may no longer be present and the controller 505 may re-open the valve 1010 at the step 410.

The HVAC system 500 may continue to operate during the waiting period. During continued operation of the HVAC system 500, active refrigerant pressure within the high side of the HVAC system 500 may normalize through the metering device 516 as it opens. The opening of the metering device 516 may result in a reduction of the refrigerant pressure within the high pressure side of the HVAC system 500 as more refrigerant is permitted to flow through the metering device 516 and into the low pressure liquid pipe 515.

The controller 505 may reopen the valve 1010 at the step 410 upon the expiration of the period of waiting time, allowing inactive liquid phase refrigerant to drain from the receptacle 1002 in response to gravity via the lower relief tube 1004. The active refrigerant pressure may have reduced, via pressure normalization through the metering device 516, to a sufficiently low level such that the inactive liquid phase refrigerant may re-enter the common manifold 808. Following re-opening of the valve 1010 at the step 410, the controller 505 may return to the step 402, repeating execution of the method 400 while the demand on the HVAC system 500 remains present.

The Fifth Pressure Relief Apparatus 1100

Figure 11:
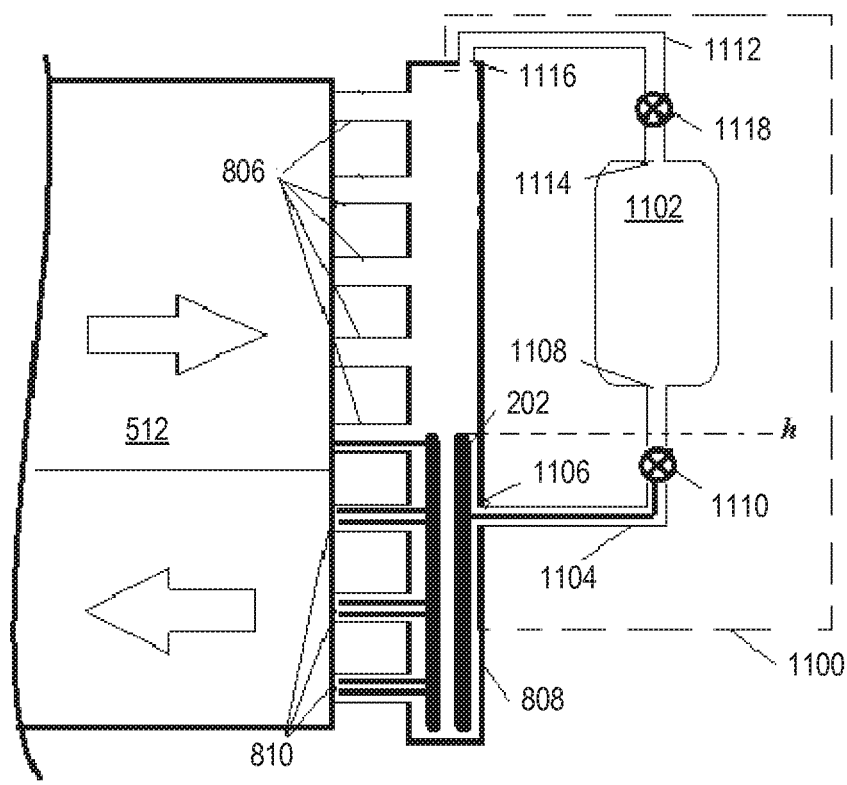
FIG. 11 depicts a fifth pressure relief apparatus coupled to a heat exchanger within an HVAC system.

Referring now to FIGS. 8 and 11, a fifth pressure relief apparatus 1100 for reducing refrigerant pressure within an HVAC system is shown. The fifth pressure relief apparatus 1100 may be implemented within the HVAC system 500. According to the embodiment shown in FIG. 11, the fifth pressure relief apparatus 1100 may comprise a receptacle 1102, a lower relief tube 1104 comprising a lower joint 1106 and an upper joint 1108, a lower valve 1110, an upper relief tube 1112 which may comprise a lower joint 1114 and an upper joint 1116, and an upper valve 1118. In alternative embodiments, the fifth pressure relief apparatus 1100 may include fewer, additional, or different components than those shown.

The fifth pressure relief apparatus 1100 may comprise one or more features, functions, and/or characteristics substantially the same as, or similar to, those of the fourth pressure relief apparatus 1000, as described above. For example, the lower tube 1104, the lower joint 1106, the upper joint 1108, and/or the valve 1110 of the fifth pressure relief apparatus 1100 may comprise one or more features, functions, and/or characteristics substantially the same as, or similar to, those of the fourth pressure relief apparatus 1000.

The receptacle 1102 may comprise one or more features, functions, and/or characteristics substantially the same as, or similar to, those of the receptacle 1002. Additionally, the receptacle 1102 may comprise one or more features, functions, and/or characteristics beyond those of the receptacle 1002. For example, the receptacle 1102 may comprise one or more additional openings beyond the single opening of the receptacle 1002. In an embodiment, the receptacle 1102 may comprise a second opening which may be disposed substantially at, or proximal to, an upper surface of the receptacle 1102. In such embodiments, the upper relief tube 1112 may couple to the receptacle 1102 at the second opening.

The fifth pressure relief apparatus 1100 may include the upper relief tube 1112 which may comprise the lower joint 1114 and the upper joint 1116, and may be implemented with the upper valve 1118. The upper relief tube 1112 may operatively connect the receptacle 1102 to the common manifold 1108. In an embodiment, the upper relief tube 1112 may comprise a conduit for placing the receptacle 1102 in fluid communication with an upper portion of the common manifold 808. The upper relief tube 1112 may provide a means of pressure equalization for gaseous phase refrigerant disposed at the upper regions of the receptacle 1102. The upper relief tube 1118, while the upper valve 1118 is open, may provide for refrigerant pressure equalization between the gaseous phase inactive refrigerant which may be trapped at the upper portion of the receptacle 1102 and the gaseous phase active refrigerant within an upper portion of the common manifold 808.

The upper relief tube 1112 may comprise a bent section of tubing having a uniform profile. In alternative embodiments, the upper relief tube 1112 may have a configuration different from that shown in the embodiment of FIG. 11. For example, the upper relief tube 1112 may have a non-uniform profile and/or may be configured to extend along a straight path, or, alternatively, along a path comprising one or more bent or curved sections.

In an embodiment, as shown, the upper relief tube 1112 may include the lower joint 1114 and upper joint 1116 which may be disposed at opposite ends of the upper relief tube 1112. In an alternative embodiment, the upper relief tube 1112 may include additional upper and/or lower joints 1114, 1116. The lower joint 1114 and the upper joint 1116 may be brazed connections. Alternatively, the lower joint 1114 and the upper joint 1116, respectively, may be welds, adhesion connections, heat shrink connections, or some other similar type of non-detachable connection method suitable for providing a sealed connection capable of withstanding stresses caused by high pressure, high temperature refrigerant within the HVAC system 500.

As shown in the embodiment of FIG. 11, the lower joint 1114 may couple the upper relief tube 1112 to an opening substantially at, or near, an upper surface of the receptacle 1102. The upper joint 1116 may couple to the common manifold 808. The upper joint 1116 may couple with the common manifold 808 substantially at, or near, an upper surface of the common manifold 808, as shown. Alternatively, the upper joint 1116 may couple with the common manifold 808 at any location along the height of the common manifold 808 which is disposed vertically above the saturation height, h, for the HVAC system 500 refrigerant within the common manifold 808. Importantly, the lower joint 1114 of the upper relief tube 1112 may be disposed at a height above that of the upper joint 1108 of the lower relief tube 1104. According to such a configuration, the liquid phase refrigerant 202 within the common manifold 808 may migrate into, or drain from, the receptacle 1102 via the lower relief tube 1104 while gaseous refrigerant from within the common manifold 808 may access the receptacle 1102 via the upper relief tube 1112.

The fifth pressure relief apparatus 1100 may include the upper valve 1118, as shown in FIG. 11. The upper valve 1118 may couple to the upper relief tube 1112 for selectively enabling, or disabling, pressure equalization between the active gaseous refrigerant within the common manifold 1108 and inactive gaseous refrigerant within the receptacle 1102. The controller 505 may operate the upper valve 1118 to switch the valve 1118 between open and closed positions in response to sensed, or detected, conditions within the HVAC system 500 and/or in accordance with one or more control methods, such as the control method 400, for example. In an embodiment, the upper valve 1118 may operably couple to the controller 505 via a wired or wireless connection. In an embodiment, the upper valve 1118 may be a solenoid valve. Alternatively, in an embodiment, the upper valve 1118 may be a check valve, a flow control valves, a three-way valve, a four way valve, or the like. According to the embodiment shown, the upper valve 1118 may be configured for normally open operation. In an alternative embodiment, the upper valve 1118 may be configured for normally closed operation.

During operation of the HVAC system 500, relatively high pressure gaseous phase inactive refrigerant may accumulate at the upper region of the receptacle 1102. The controller 505 may open the upper valve 1118 to permit pressure equalization of gaseous phase inactive and active refrigerant. The upper relief tube may provide a conduit allowing gaseous phase inactive refrigerant at relatively high pressure within the receptacle 1102 to escape into the common manifold 808. If permitted to accumulate in the receptacle 1102, relatively high pressure gaseous phase inactive refrigerant may provide resistance to migration of liquid phase refrigerant into the receptacle 1102 at times of high pressure within the HVAC system 500, reducing the effectiveness of the fifth pressure relief apparatus 1100. Additionally, or alternatively, an accumulation of relatively high pressure gaseous phase inactive refrigerant may force inactive refrigerant that has migrated into the receptacle 1102 back into the common manifold 1108 prematurely, during or following a high pressure condition.

Further, providing for pressure relief at the upper portion of the receptacle 1102 may prevent development of a "second environment" within the receptacle 1102 during operation of the fifth pressure relief apparatus 1100. A second environment may develop within the receptacle 1102 if the inactive refrigerant within the receptacle 1102 begins condense and/or evaporate within the upper portions of the receptacle 1102.

When implemented with the HVAC system 500, as shown in FIG. 11, the fifth pressure relief apparatus 1000 may be operated by the controller 505 in accordance with the methods 300, 400 to reduce the HVAC system 500 refrigerant pressure, or pressures. Operation of the fifth pressure relief apparatus 1100 in accordance with the methods 300, 400 may be similar to the operation of the fourth pressure relief apparatus 1000 in accordance with the methods 300, 400. As applied to the specific configuration of the fifth pressure relief apparatus 1100, the controller 505 may simultaneously set the positions of both the upper valve 1118 and lower valve 1110, with the upper valve 1118 position set to match that of the lower valve 1110. Advantageously, the fifth pressure relief apparatus 1100 may be operable to provide some or all of the functions provided by the respective pressure relief apparatuses 600, 700, 900, 1000, while additionally preventing a pressure buildup within the upper region of the receptacle 1102 which may adversely affect the pressure reducing performance of fifth pressure apparatus 1100, as noted above.

In a particular embodiment, the HVAC system 500 may be implemented with the fifth pressure relief apparatus 1100 coupled to the common manifold 808. The particular HVAC system 500 embodiment may comprise the compressors 506A, B configured for tandem operation, a microchannel coil condenser 512, and a microchannel coil evaporator 518. The controller 505 may operate the fifth pressure relief apparatus 1100 within the particular HVAC system 500 embodiment described in accordance with the method 400.

A demand for cooling operation of the particular embodiment of the HVAC system 500 described may be received by the controller 505 while the valves 1110, 1118 are open. The controller 505 may leave the valves 1110, 1118 in the open position at the step 402. The controller 505 may check for conditions within the HVAC system 500 that may make the occurrence of high discharge pressure likely at the step 404. The controller 505 may determine that the HVAC system 500 is operating in response to a demand requiring energizing of one, or both, of the tandem compressors 506A. B and may determine that a condition likely to cause high discharge pressure exists at the step 404.

Upon finding that a condition likely to cause high discharge pressure exists within the HVAC system 500, the controller 505 may maintain the valves 1110, 1118 in the open position for sixty fifths before commanding the valves 1110, 1118 to the closed position at the step 408. During the waiting period, a portion of the active refrigerant within the HVAC system 500 may migrate into the receptacle 1102 in response to relatively high refrigerant pressures within the HVAC system 500, such as within the high pressure side of the HVAC system 500. Inactive refrigerant may collect within the receptacle 1102, reducing the amount of active refrigerant within the HVAC system and causing a reduction of one or more refrigerant pressures within the HVAC system 500. Inactive refrigerant may be trapped within the receptacle 1102 upon the closing of the valves 1110, 1118 at the step 408.

The controller 505 may maintain the valves 1110, 1118 in the closed position for a period of time at the step 410 before re-opening the valves 1110, 1118. In an embodiment, the amount of time may be a period of within time with a range from between about one to 60 minutes. Alternately, the controller 505 may wait at the step 410 until the condition indicating a likelihood of high discharge pressure found at the step 404 is no longer present. As another alternative, the controller 505 may wait until no conditions indicating a likelihood of high discharge pressure, as defined at the step 404, are present within the HVAC system 500. Alternatively, or additionally, the controller 505 may wait until the demand on the HVAC system 500 is met. At the expiration of the defined waiting time, a high pressure condition within the HVAC system 500 may no longer be present and the controller 505 may re-open the valves 1110, 1118 at the step 410.

The HVAC system 500 may continue to operate during the waiting period. During continued operation of the HVAC system 500, active refrigerant pressure within the high pressure liquid pipe 514 may normalize through the metering device 516 as it opens. The opening of the metering device 516 may result in a reduction of the refrigerant pressure within the high pressure side of the HVAC system 500 as more refrigerant is permitted to flow through the metering device 516 and into the low pressure liquid pipe 515.

The controller 505 may reopen the valves 1110, 1118 at the step 410 upon the expiration of the period of waiting time, allowing inactive liquid phase refrigerant to drain from the receptacle 1102 in response to gravity via the lower relief tube 1104. The active refrigerant pressure may have reduced, via pressure normalization through the metering device 516, to a sufficiently low level such that the inactive liquid phase refrigerant may re-enter the common manifold 808. Additionally, relatively high pressure inactive gaseous phase refrigerant within the receptacle 1102 may escape to the common manifold 808, preventing development of a second environment or a pressure buildup of gaseous phase inactive refrigerant within the receptacle 1102. Following re-opening of the valves 1110, 1118 at the step 410, the controller 505 may return to the step 402, repeating execution of the method 400 while the demand on the HVAC system 500 remains present.

In the previous discussion, numerous specific details provide a thorough explanation. However, such specific details are not essential. In other instances, well-known elements have been illustrated in schematic or block diagram form. Additionally, for the most part, specific details within the understanding of persons of ordinary skill in the relevant art have been omitted.

It is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of various embodiments.

The invention claimed is:

1. A heating, ventilation, and air-conditioning (HVAC) system, comprising:
   a receptacle;
   a first tube comprising a first end and a second end, the first tube coupled to a manifold at the first end and coupled to the receptacle at the second end, the manifold coupled to a condenser of the HVAC system and configured to receive refrigerant from at least one outlet of a first pass of tubing for routing refrigerant through the condenser,
   wherein the receptacle is in fluid communication with the at least one outlet of the first pass of tubing through the condenser via the first tube, the first tube configured to form a conduit for refrigerant migration into the receptacle in response to, at least, one or more high refrigerant pressures within the HVAC system, and the first tube configured to form a conduit for refrigerant draining from the receptacle in response to, at least, one or more low refrigerant pressures within the HVAC system;
   a first valve coupled to the first tube, the first valve configured to permit refrigerant to migrate into or drain from the receptacle when open, the first valve further configured to prevent refrigerant to migrate into or drain from the receptacle when closed; and
   a controller operable to:
      determine whether at least one condition indicating a likelihood of one or more high refrigerant pressures within the HVAC system is present;
      generate a first control signal configured to, at least, switch the first valve from an open to a closed position in response to determining that at least one condition indicating a likelihood of one or more high refrigerant pressures within the HVAC system is present and upon expiration of a defined first period of time; and generate a second control signal configured to, at least, switch the first valve from a closed to an open position following generation of the first control signal and upon expiration of a defined second period of time.

2. The system of claim 1, wherein the second end of the first tube is disposed at a position vertically higher than the first end of the first tube; and wherein refrigerant within the receptacle drains from the receptacle via the first tube in response to, at least, the force of gravity.

3. The system of claim 1, wherein the refrigerant within the manifold comprises both liquid phase and gas phase refrigerant, and wherein first tube is configured to allow migration of liquid phase refrigerant into the receptacle in response to at least, one or more high refrigerant pressures within the HVAC system.

4. The system of claim 3, wherein the first tube is coupled to the manifold at a location vertically below a saturation height of refrigerant within the manifold, and wherein the second end of the first tube is disposed at a location vertically above the saturation height of refrigerant within the manifold.

5. The system of claim 1, further comprising:
a second tube comprising a first end and a second end, the second tube coupled to the receptacle at the first end and coupled to the manifold at the second end, the second tube configured to form a conduit for refrigerant migration between the receptacle and the manifold allowing for one or more pressure differences between refrigerant within the receptacle and refrigerant within the manifold may dissipate through the second tube; and
a second valve coupled to the second tube, the second valve configured to permit refrigerant migration between the receptacle and the manifold when open, the second valve further configured to prevent refrigerant flow between the receptacle and the manifold when closed;
the controller further operable to:
generate the first control signal configured to, at least, switch both the first and second valves from open to closed positions in response to determining that at least one condition indicating a likelihood of one or more high refrigerant pressures within the HVAC system is present and upon expiration of a defined first period of time; and
generate the second control signal configured to, at least, switch the first and second valves from closed to open positions following generation of the first control signal and upon expiration of a defined second period of time.

6. The system of claim 5, wherein the first and second valves are solenoid valves.

7. The system of claim 5, wherein the refrigerant within the manifold comprises both liquid phase and gas phase refrigerant, and wherein second tube is configured to allow migration of gaseous phase refrigerant between the receptacle in response to at least, one or more refrigerant pressure differences between refrigerant within the receptacle and refrigerant within the manifold.

8. The system of claim 7, wherein the second tube is coupled to the manifold at a location vertically above a saturation height of refrigerant within the manifold, and wherein the first end of the second tube is disposed at a location vertically above the saturation height of refrigerant within the manifold.

9. The system of claim 1, further comprising:
a first compressor and a second compressor, the first and second compressors configured for operation as tandem compressors and in fluid communication with the condenser; and
wherein the condenser is a microchannel heat exchanger.

10. The system of claim 1, wherein the receptacle is disposed downstream of the condenser.

11. A method comprising:
determining, using a controller, whether at least one condition indicating a likelihood of one or more high refrigerant pressures within a heating, ventilation, and air-conditioning (HVAC) system is present;
generating, using the controller, a first control signal configured to, at least, switch a first valve from an open to a closed position in response to determining that at least one condition indicating a likelihood of one or more high refrigerant pressures within the HVAC system is present and upon expiration of a defined first period of time;
wherein the first valve is coupled to a first tube, the first valve configured to permit refrigerant to flow through the first tube when open and configured to prevent refrigerant to flow through the first tube when closed, the first tube coupled to a manifold of a condenser, the manifold configured to receive refrigerant from at least one outlet of a first pass of tubing of the condenser;
wherein the first tube is coupled to a first receptacle, the first receptacle configured to be in fluid communication with the first pass of tubing through a condenser via the first tube and the manifold for receiving refrigerant exiting the first pass of the condenser at times when one or more high refrigerant pressures are present within the HVAC system;
generating, using the controller, a second control signal configured to, at least, switch the first valve from a closed to an open position following generation of the first control signal and upon expiration of a defined second period of time.

12. The method of claim 11, further comprising:
generating, using the controller, the second control signal for, at least, switching the first valve from a closed to an open position upon the controller determining that the at least one condition indicating a likelihood of one or more high refrigerant pressures within the HVAC system is no longer present.

13. The method of claim 11, further comprising:
generating, using the controller, the second control signal for, at least, switching the first valve from a closed to an open position upon the controller determining that no conditions indicating a likelihood of one or more high refrigerant pressures within the HVAC system are present.

14. The method of claim 11, further comprising:
generating, using the controller, the second control signal for, at least, switching the first valve from a closed to an open position upon the controller determining the end of demand on the HVAC system.

15. The method of claim 11, further comprising:
receiving, using the controller, a triggering input signal indicating a demand on the HVAC system and, in response to receiving the triggering input signal, the controller determining whether at least one condition indicating a likelihood of one or more high refrigerant pressures within the HVAC system is present.

16. A heating, ventilation, and air-conditioning (HVAC) system, comprising:

a receptacle;

a first tube comprising a first end and a second end, the first tube coupled to a manifold at the first end and coupled to the receptacle at the second end, the manifold coupled to a condenser of the HVAC system and configured to receive refrigerant from at least one outlet of a first pass of tubing for routing refrigerant through the condenser;

wherein the receptacle is in fluid communication with the at least one outlet of the first pass of tubing through the condenser via the first tube, the first tube configured to form a conduit for refrigerant migration into the receptacle in response to, at least, one or more high refrigerant pressures within the HVAC system, and the first tube configured to form a conduit for refrigerant draining from the receptacle in response to, at least, one or more low refrigerant pressures within the HVAC system;

a first valve coupled to the first tube, the first valve configured to permit refrigerant to migrate into or drain from the receptacle when open, the first valve further configured to prevent refrigerant to migrate into or drain from the receptacle when closed;

wherein the second end of the first tube is disposed at a position vertically higher than the first end of the first tube; and wherein refrigerant within the receptacle drains from the receptacle via the first tube in response to, at least, the force of gravity.

17. The system of claim 16, further comprising:

a controller, wherein the controller is operable to:
  determine whether at least one condition indicating a likelihood of one or more high refrigerant pressures within the HVAC system is present;
  generate a first control signal configured to, at least, switch the first valve from an open to a closed position in response to determining that at least one condition indicating a likelihood of one or more high refrigerant pressures within the HVAC system is present and upon expiration of a defined first period of time; and
  generate a second control signal configured to, at least, switch the first valve from a closed to an open position following generation of the first control signal and upon expiration of a defined second period of time.

18. The system of claim 16, wherein:

the refrigerant within the manifold comprises both liquid phase and gas phase refrigerant, and wherein first tube is configured to allow migration of liquid phase refrigerant into the receptacle in response to at least, one or more high refrigerant pressures within the HVAC system; and the first tube is coupled to the manifold at a location vertically below a saturation height of refrigerant within the manifold, and wherein the second end of the first tube is disposed at a location vertically above the saturation height of refrigerant within the manifold.

19. The system of claim 16, further comprising:

a second tube comprising a first end and a second end, the second tube coupled to the receptacle at the first end and coupled to the manifold at the second end, the second tube configured to form a conduit for refrigerant migration between the receptacle and the manifold allowing for one or more pressure differences between refrigerant within the receptacle and refrigerant within the manifold may dissipate through the second tube; and a second valve coupled to the second tube, the second valve configured to permit refrigerant migration between the receptacle and the manifold when open, the second valve further configured to prevent refrigerant flow between the receptacle and the manifold when closed;

the controller further operable to:
  generate the first control signal configured to, at least, switch both the first and second valves from open to closed positions in response to determining that at least one condition indicating a likelihood of one or more high refrigerant pressures within the HVAC system is present and upon expiration of a defined first period of time; and
  generate the second control signal configured to, at least, switch the first and second valves from closed to open positions following generation of the first control signal and upon expiration of a defined second period of time.

20. The system of claim 16, further comprising:

a first compressor and a second compressor, the first and second compressors configured for operation as tandem compressors and in fluid communication with the condenser; and wherein the condenser is a microchannel heat exchanger.

* * * * *